US009066145B2

(12) United States Patent  
Kilar et al.

(10) Patent No.: US 9,066,145 B2  
(45) Date of Patent: Jun. 23, 2015

(54) COMMENTING CORRELATED TO TEMPORAL POINT OF VIDEO DATA

(75) Inventors: Jason A. Kilar, Santa Monica, CA (US); Betina J. Chan-Martin, Encino, CA (US); Bradley J. Suter, Santa Monnica, CA (US); Gavin F. Hewitt, Marina del Rey, CA (US); Damon A. Young, Thousand Oaks, CA (US); Arash Nikkar, La Crescenta, CA (US); Arthur Switalski, San Carlos, CA (US); Richard W. Tom, Marina del Rey, CA (US); Haisheng Wu, Beijing (CN); Yingan Wang, Beijing (CN); Eugene Wei, San Francisco, CA (US)

(73) Assignee: HULU, LLC, Santa Monica, CA (US)

( * ) Notice: Subject to any disclaimer, the term of this patent is extended or adjusted under 35 U.S.C. 154(b) by 116 days.

(21) Appl. No.: 13/431,952

(22) Filed: Mar. 27, 2012

(65) Prior Publication Data

US 2013/0004138 A1 Jan. 3, 2013

Related U.S. Application Data

(60) Provisional application No. 61/503,536, filed on Jun. 30, 2011.

(51) Int. Cl.
| | |
|---|---|
| *H04N 5/92* | (2006.01) |
| *H04N 21/4788* | (2011.01) |
| *H04N 21/475* | (2011.01) |
| *H04N 21/658* | (2011.01) |
| *H04N 21/845* | (2011.01) |

(52) U.S. Cl.  
CPC ....... *H04N 21/4788* (2013.01); *H04N 21/4756* (2013.01); *H04N 21/6582* (2013.01); *H04N 21/8455* (2013.01)

(58) Field of Classification Search  
CPC ....... H04N 5/85; H04N 9/8042; H04N 5/775; H04N 21/4756; H04N 21/4788; H04N 21/6582; H04N 21/8455; G11B 27/105; G11B 27/329; G11B 27/034  
USPC ......................................................... 386/241  
See application file for complete search history.

(56) References Cited

U.S. PATENT DOCUMENTS

| | | | |
|---|---|---|---|
| 2004/0001695 A1* | 1/2004 | Evans et al. | 386/68 |
| 2007/0263984 A1* | 11/2007 | Sterner et al. | 386/95 |
| 2009/0158154 A1* | 6/2009 | Kim | 715/716 |
| 2011/0273474 A1* | 11/2011 | Iwayama | 345/636 |
| 2012/0124039 A1* | 5/2012 | Sandholm et al. | 707/724 |
| 2012/0284343 A1* | 11/2012 | Lee et al. | 709/206 |

* cited by examiner

*Primary Examiner* — William Tran  
(74) *Attorney, Agent, or Firm* — Fountainhead Law Group PC

(57) ABSTRACT

Commenting tied to user-selected times during play of audio/video content is enabled by a computer system. An apparatus detects a time that input of user comment data is received during playback of audio/video content on an electronic display device. The apparatus determines a temporal point relative to the playback of the audio/video content correlated to the user comment data, based on the time. The apparatus transmits the user comment data correlated to identifiers for the audio-video content and the temporal point to a computer server. The server may configure the video data for publishing on a website so that the comment data is displayed for a limited period based on the temporal point. Users may thereby conveniently record audio or textual comments that are output during subsequent play of the audio/video content, for sharing with friends and others.

32 Claims, 21 Drawing Sheets

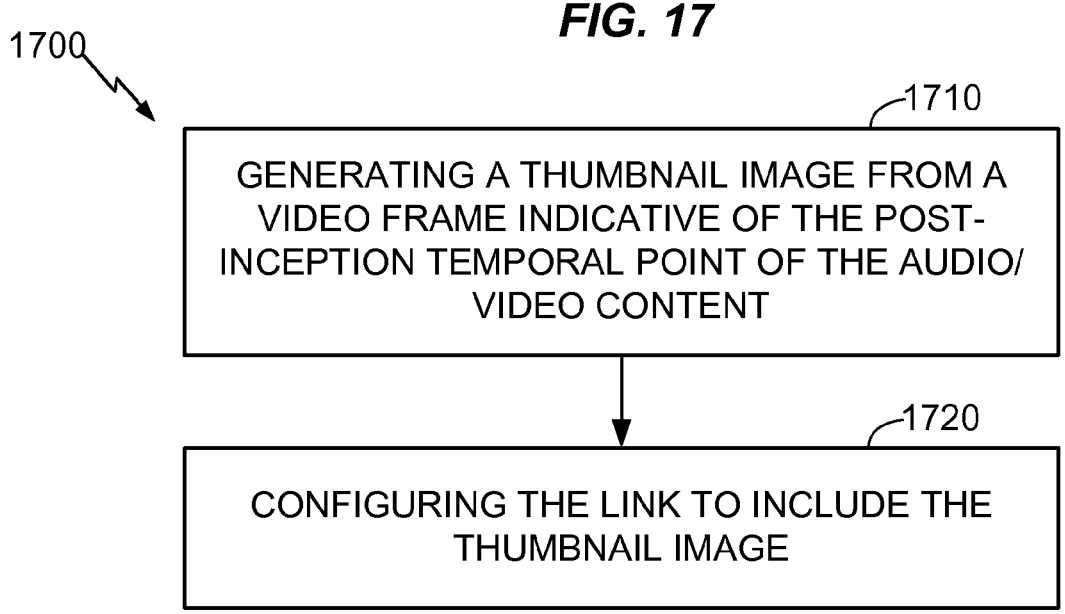
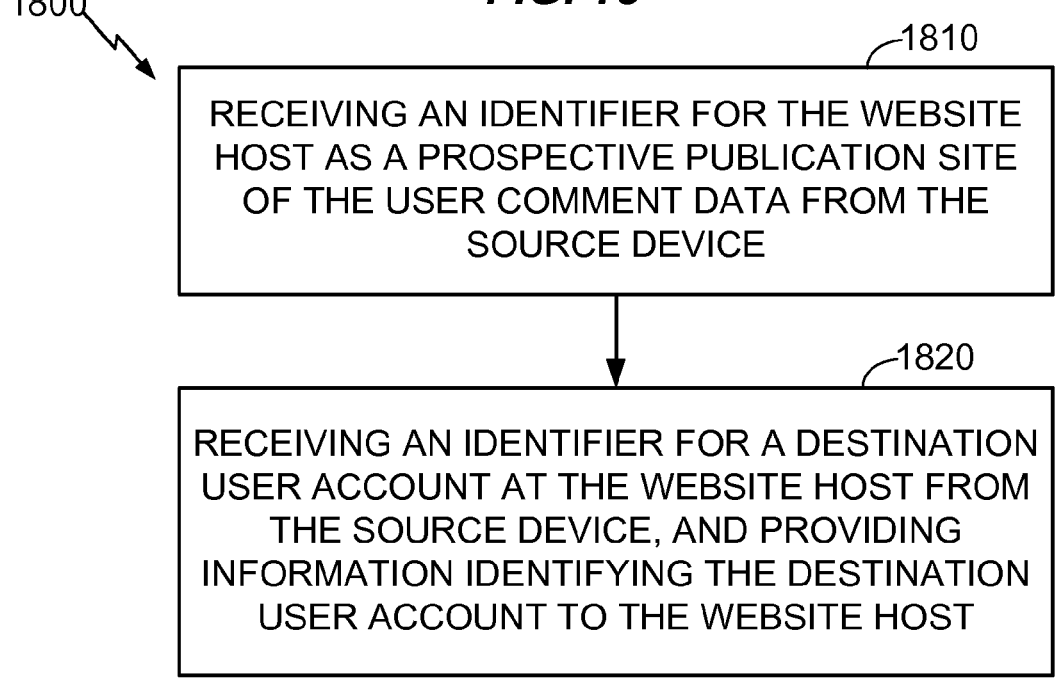

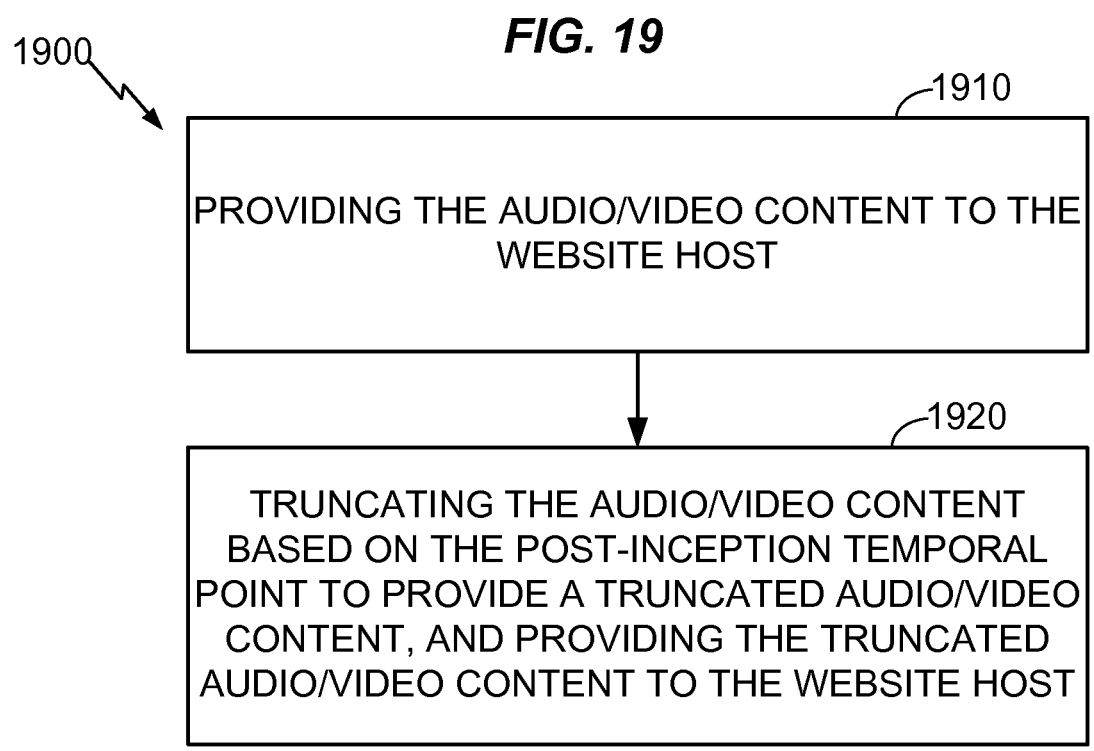

COMMENTING CORRELATED TO TEMPORAL POINT OF VIDEO DATA

CROSS-REFERENCE TO RELATED APPLICATION

This application claims priority pursuant to 35 U.S.C. §119 (e) to U.S. provisional application Ser. No. 61/503,536, filed Jun. 30, 2011, which is hereby incorporated by reference, in its entirety.

FIELD

The present application relates generally to input/output processing using a computer, and more particularly to enabling collection, configuration and distribution of user comments correlated to user selected times during playback of a video data.

BACKGROUND

Video data, including audio-video data, is increasingly distributed over computer networks, telecommunications networks, and combinations of such networks, for the viewing and enjoyment of network users. Video data is often distributed as discrete video files or video clips posted on social networking websites, as a way for members of such sites to share video content with members of a social group. Video files or clips are also frequently distributed by posting on public forum websites, where access to the video is available to the general public and is not restricted to a particular group of users. Both public forums and social network sites may often include features that enable users to post comments about any posted content, including video content. Such features may cause comments about posted video content to appear adjacent to a video link to the video content. The comments adjacent to the video link may be visible to a user's designated "friends" (i.e., members of the social network that share access to the user's content) when posted by the user or to the general public, and be presented in an interface that enables a comment thread to be developed from additional user comments responding to the original comment or video content. Through these connections, users may share video and other content including recommendations and commentary with friends or others.

For example, a user may view a video on a video content distributor website such as www.hulu.com or the like, and decide to post it on a social networking website, such as www.facebook.com or www.twitter.com for example. The video website may enable such sharing by presenting one or more icons related to different social networks. By selecting a "share" icon, a window may pop up on the video content site and prompt a user to insert a comment to accompany the video. The user may then enter a comment, and post a link to the video and comment to the user's homepage of the social network chosen, via a content sharing module of the video content distribution site in cooperation with the social networking site. Notwithstanding the advantages of prior video commenting methods, such methods may be subject to certain limitations. For example, prior commenting methods do not enable commentators to conveniently direct an intended audience to a precise portion of video content, nor to indicate such portion in an iconic manner. These and other limitations of prior video commenting methods may be overcome by the novel methods and apparatus disclosed herein.

SUMMARY

Methods, apparatus and systems for configuration and distribution of user comments correlated to user selected times during playback of a video data are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for providing user comment data correlated to a temporal point in playback of audio/video content may be performed by a client device. The method may include detecting a time that input of user comment data is received during playback of audio/video content on an electronic display device. The method may include determining a temporal point relative to the playback of the audio/video content correlated to the user comment data, based on the time. The method may further include transmitting the user comment data correlated to identifiers for the audio-video content and the temporal point to a computer server.

In another aspect, the method may include providing data for a user interface, including control objects for the playback of the audio/video content and entry of the user comment data, to the electronic display device. Detecting the time may be based on a time that input of the user comment data is initiated, based on a time that input of the user comment data is completed, or some other time. The method may include receiving the user input from a user input device local to the electronic display device. The method may include detecting user input of the user comment data.

In other aspects, the method may include identifying a source identifier for the user input data, and transmitting the source identifier to the computer server. The source identifier may be, or may include, a user account identifier, such as, for example, an account name or account number. In addition, the method may include identifying a website and destination user account as a prospective publication site of the user comment data, based on further user input, and transmitting information identifying the prospective publication site of the user comment data to the computer server.

A computer server in communication with one or more client devices may perform a method for providing a link to digital audio/video content responsive to user comment data. The method may include receiving, from a source device, an electronic transmission of user comment data correlated to identifiers for audio/video content and a post-inception temporal point in the audio/video content. The method may further include configuring a link to the audio/video content including an indication of the post-inception temporal point. The method may further include providing the user comment data with the link to a website host for publication on a website.

In an aspect, the method may include generating a thumbnail image from a video frame indicative of the post-inception temporal point of the audio/video content. The method may further include configuring the link to include the thumbnail image.

In another aspect, the method may include receiving an identifier for the website host as a prospective publication site of the user comment data from the source device. For example, the method may include receiving an identifier for a destination user account at the website host from the source device, and providing information identifying the destination user account to the website host.

In another aspect, the method may include truncating the audio/video content based on the post-inception temporal point to provide a truncated audio/video content (e.g., a video clip), and providing the truncated audio/video content to the website host.

A website host may perform a method for providing a link to audio/video content referencing a temporal point for user comment data. The method may include receiving a link to audio/video content and to a post-inception temporal point of the audio/video content. The method may include publishing the link on a webpage. The method may include initiating streaming of the audio/video content to a client device at the post-inception temporal point, in response to detecting selecting of the link.

In an aspect, the method performed by the website host may include receiving comment data correlated to the link. The method may further include publishing the comment data with the link. The method may include displaying a thumbnail image from a video frame indicative of the post-inception temporal point of the audio/video content as an icon for the link.

In another aspect, the method may include receiving an identifier for a user account with the link, and selecting the webpage based on the user account. The method may include configuring the webpage to include content submitted by a group of independent users identified with the user account. The method may include configuring the webpage to include content submitted by a group of independent users identified with a second user account, wherein the user account is identified as a member of the group of independent users.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for configuration and distribution of user comments correlated to user selected times during playback of a video data are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIGS. 16-19 are diagrams illustrating operations that may be performed by a computer server in connection with configuration and distribution of a user comment correlated to a user selected temporal point of video data.

DETAILED DESCRIPTION

Figure 1:
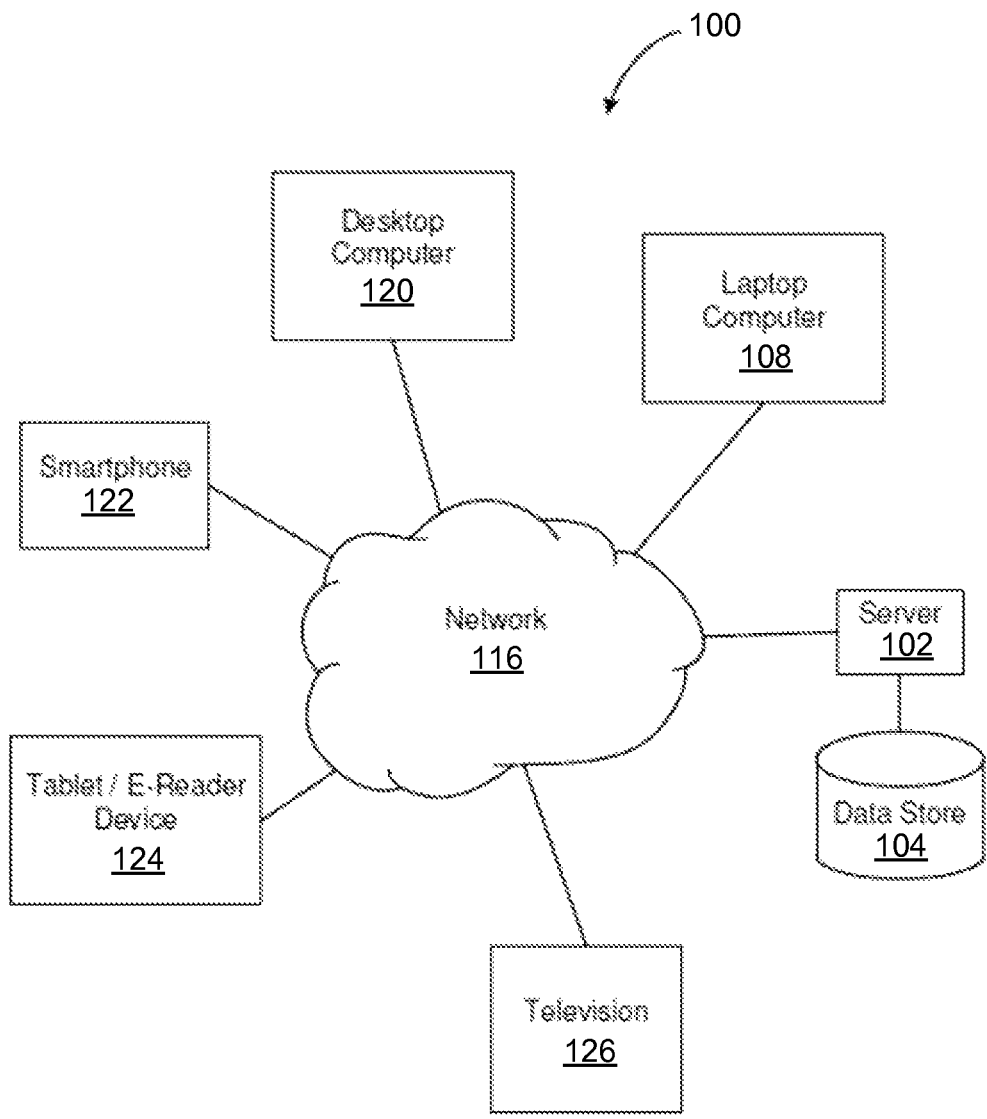
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

In selected embodiments, the features and aspects disclosed herein may be implemented within a computing environment 100. Such an environment 100 may include one or more computer servers 102. A server 102 may be operatively coupled to one or more data stores 104 (e.g., databases, indexes, files, or other data structures). A server 102 may connect to a data communication network 116. A data communication network 116 may comprise a local area network (LAN), a wide area network (WAN) (e.g., the Internet), a telephone network, a wireless cellular telecommunications network, or some combination of these or similar networks.

One or more client devices may be in communication with the server 102, and a corresponding data store 104, via the data communication network 116. Such client devices may include, for example, one or more laptop computers 108, desktop computers 120, smart phones 122, mobile phones 124, televisions 126, or combinations thereof. In operation, such client devices 108, 120, 122, 124, 126 may send and receive data or instructions to the server 102, in response to user input received from user input devices or other input. In response, the server 102 may serve data from the data store 104, alter data within the data store 104, add data to the data store 104, or the like or combinations thereof.

In selected embodiments, the server 102 may stream or transmit one or more video files including video content, audio content and/or metadata from the data store 104 to one or more of the client devices 108, 120, 122, 124, 126 via the data communication network 116. The devices 108, 120, 122, 124, 126 may output video content from the video file using a display screen, projector, or other video output device. For example, the video file may comprise a clip of a movie, television show, news broadcast, or portion thereof for output using a display device of one or more of the client devices 108, 120, 122, 124, 126. In certain embodiments, the system 100 configured in accordance with the features and aspects disclosed herein may be configured to operate within or support a cloud computing environment. For example, a portion of, or all of, the data store 104 and server 102 may reside in a cloud server.

Figure 2:
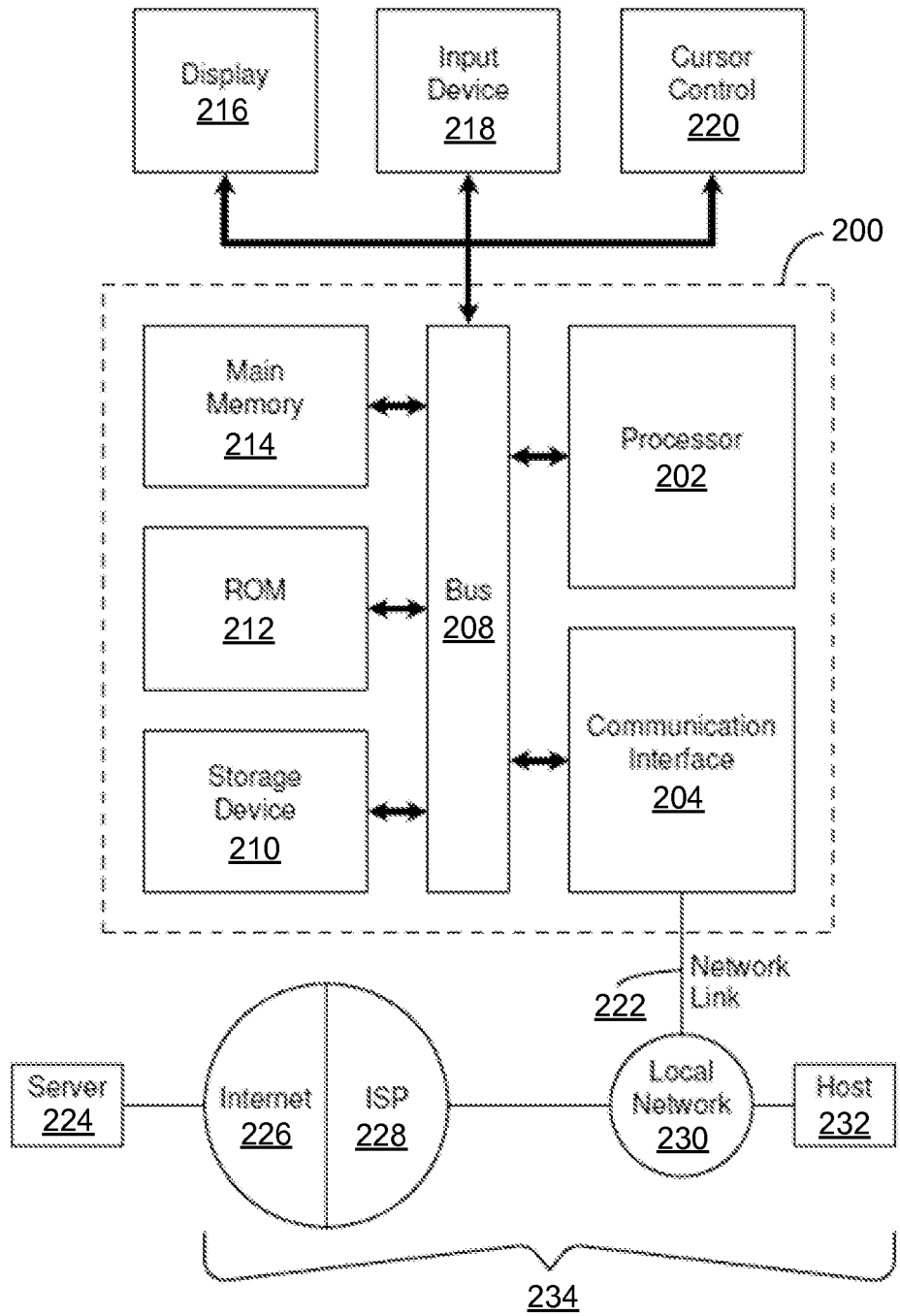
FIG. 2 is a schematic block diagram illustrating another embodiment of a computer system for supporting and executing the systems and methods described herein.

Referring to FIG. 2, a diagrammatic view of an example computer 200 is illustrated. One or more of the devices 102, 108, 120, 122, 124, 126 of the system 100 may be configured as or include such a computer 200. In selected embodiments, the computer 200 may include a bus 208 or other communication mechanism 208, a processor 202, main memory 214, read only memory (ROM) 212, one or more additional storage devices 210, a communication interface 204, or the like or sub-combinations thereof.

A bus 208 or other communication mechanism 208 may support communication of information within the computer 200. A processor 202 may be connected to a bus 208 and process information. In selected embodiments, a processor 202 may be a specialized or dedicated microprocessor configured to perform particular tasks in accordance with the features and aspects disclosed herein by executing machine-readable software code defining the particular tasks. Main memory 214 (e.g., random access memory (RAM) or other dynamic storage device) may be connected to a bus 208 and store information and instructions to be executed by a processor 202. Main memory 214 may also store temporary variables or other intermediate information during execution of such instructions.

Read only memory (ROM) 212 or some other static storage device 212 may be connected to a bus 208 and store static information and instructions for a processor 202. An additional storage device 210 (e.g., a magnetic disk, optical disk, memory card, or the like) may be connected to a bus 208. The additional storage device 210 may include a non-transitory computer-readable medium holding information, instructions, or some combination thereof, for example instructions that when executed by the processor 202, cause the computer 200 to perform one or more operations of a method as described herein. A communication interface 204 may also be connected to a bus 208. A communication interface 204 may provide or support two-way data communication between a computer 200 and one or more external devices (e.g., other devices 108, 120, 122, 124, 126 contained within the computing environment 100).

In selected embodiments, a computer 200 may be connected (e.g., via a bus 208) to a display 216. A display 216 may use any suitable mechanism to communicate information to a user of a computer 200. For example, a display 216 may include or utilize a cathode ray tube (CRT), liquid crystal display (LCD), light emitting diode (LED) display, projector, or other display device to present information to a user of the computer 200 in a visual display.

One or more input devices 218 (e.g., an alphanumeric keyboard or microphone) may connected to a bus 208 to communicate information and commands to a computer 200. In selected embodiments, one input device 218 may provide or support control over the positioning of a cursor. Such a cursor control device 220, also called a pointing device, may be configured as a mouse, a trackball, a track pad, touch screen, cursor direction keys or other device for receiving or tracking physical movement and translating the movement into electrical signals indicating cursor movement. A cursor control device 220 may communicate direction information and command selections to a processor 202 and control cursor movement on a display 216. A cursor control device 220 may have two or more degrees of freedom, for example allowing the device 220 to specify cursor positions in a plane or three-dimensional space.

The computer 200 may be used to transmit, receive, display, or the like one or more video files. In selected embodiments, such transmitting, receiving, and displaying may be in response to a processor 202 executing one or more sequences of one or more instructions contained in main memory 214. Such instructions may be read into main memory 214 from another non-transitory computer-readable medium (e.g., a storage device 210).

Execution of sequences of instructions contained in main memory 214 may cause a processor 202 to perform one or more of the procedures or steps described herein. In selected embodiments, one or more processors 202 in a multi-processing arrangement may also be employed to execute sequences of instructions contained in main memory 214. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical or magnetic disks, such as an additional storage device 210. Volatile media may include dynamic memory, such as main memory 214. Common forms of non-transitory computer-readable media may include, for example, a floppy disk, a flexible disk, hard disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 204 may provide or support external, two-way data communication to or via a network link 222. For example, a communication interface 204 may be a wireless network interface controller or a cellular radio providing a data communication connection. Alternatively, a communication interface 204 may comprise a local area network (LAN) card providing a data communication connection to a compatible LAN. In any such embodiment, a communication interface 204 may send and receive electrical, electromagnetic, or optical signals conveying information.

A network link 222 may provide data communication through one or more networks to other data devices (e.g., client devices as shown in the computing environment 100). For example, a network link 222 may provide a connection through a local network 230 of a host computer 232 or to data equipment operated by an Internet Service Provider (ISP) 228. An ISP 228 may, in turn, provide data communication services through the Internet 226. Accordingly, a computer 200 may send and receive commands, data, or combinations thereof, including program code, through one or more networks 230, 226, a network link 222, and communication interface 204. Thus, a computer 200 may interface or otherwise communicate with a remote server 224 (e.g., server 102). Instructions received by a computer 200 may be executed by a processor 202 as they are received, stored for later execution (e.g., stored on a storage device 210), or some combination thereof.

Figure 3:
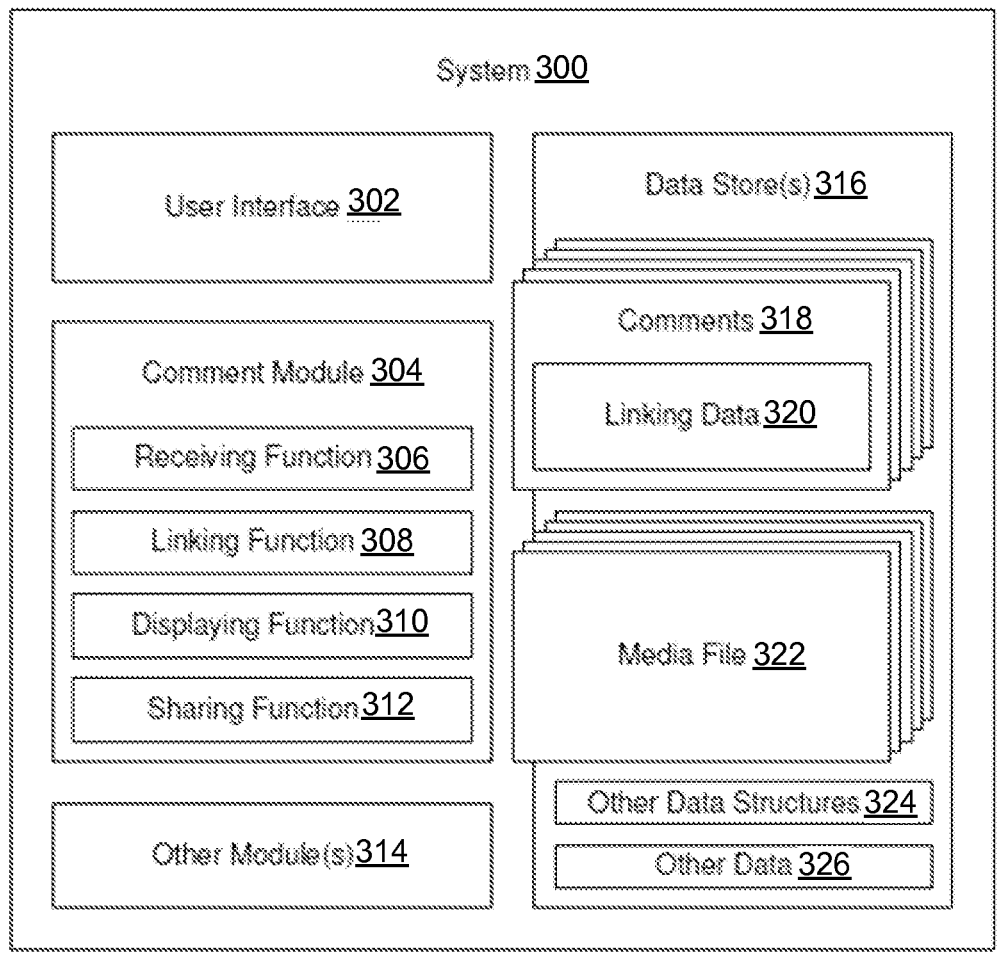
FIG. 3 is a schematic block diagram illustrating an embodiment of a system for receiving, associating, displaying, and sharing comments corresponding to video files.

Referring to FIG. 3, in selected embodiments, a system 300 in accordance with the features and aspects disclosed herein may associate one or more comments 318 received from users (e.g., media listeners, media viewers, or the like) via various client devices with a specific temporal point in one or more audio/video files 322 generated by one or more content providers. A video file includes video data characterized by a sequence of video frames that are output in order at a defined frame rate to generate video output. At such, a video file includes an initial or first frame at inception of video output, and each subsequent frame is output at a defined time after inception. Thus, each frame defines a particular time or "temporal point" in the video file, typically measured from the time of inception. For example, for a video configured for 30 frames per second, the 300$^{th}$ frame defines a temporal point 10 seconds after inception. A temporal point in a video file may sometimes be referred to herein as a "location" in relation to a progress bar or other time indicator.

Comments 318 may be in the form of text data, for example, as generated from keyboard input or by processing audio input using a speech-to-text component. The system 300 may enable users to "tie" their comments 318 to specific temporal points in audio/video files 322, in which video files the users may have no ability or right to modify directly. The "tie" may be in the form of a relational data structure that associates a comment record with an identifier for a video file and a specific temporal point in the video file. The users may be independent of and distinct from the content providers and generally do not possess the capability to edit or create the audio/video files 322.

In certain embodiments, an audio/video file 322 may be any one of a variety of audio/video files 322 currently available on websites, including podcasts or other audio files, video and accompanying audio presentations, movies and other content such as found on websites such as www.hulu-.com for example, private video clips on sites such as www.youtube.com for example, or associated with advertising, including advertising with or without using audio and/or visual content. A system 300 may associate one or more comments 318 with one or more audio/video files 322 through any suitable arrangement of hardware, software, or combinations thereof.

In certain embodiments, a system 300 may include one or more user interface components 302. Each such user interface 302 may enable and support interaction between one or more users and the system 300. Different user interfaces 302 may support users of different types. For example, one user interface 302 may support one or more builders of the system 302, maintainers of the system 302, or the like, while another user interface 302 may support one or more clients or customers of the system 302 (e.g., content providers, human users seeking to view or listen to one or more video files, or the like). A user interface component may be a software component that manages exchange of information and instructions with a user operating the system 300 via a user interface.

A system 300 may include a data store 316 or collection of data stores 316. A data store 316 may contain certain files, data structures, data, or the like to be used by the various components of a system 300. In selected embodiments, a data store 316 may contain one or more audio/video files 322 (e.g., audio files, video files, or the like). Additionally, a data store 316 may contain one or more comments 318.

A comment 318 may comprise text data, audio data, video data, or the like input by a user to a system 300. In selected embodiments, a system 300 may include a comment module 304 cooperating with a user interface 302 and one or more data stores 316 in handling comments 318 input by users. For example, a comment module 304 may include or perform a receiving function 306 enabling a system 300 to receive and store comments 318 from users. A comment module 304 may also include or perform one or more of a linking function 308, displaying function 310, sharing function 312, or the like.

A linking function 308 may form an association between a comment 318 and a selected temporal point, portion, segment, or subset of a particular video file 322. A linking function 308 may form such an association in any suitable manner, for example, by relating a comment record with an identifier for a video file and a specific temporal point of the video file in a relational data structure. In selected embodiments, a linking function 308 may generate linking data 320. Linking data 320 may identify the video file 322 to which a comment 318 pertains. Linking data 320 may also identify a temporal point of the video file 322 to which the comment 318 pertains. For example, linking data 320 may include time data defining or identifying a time point or partial portion of a video file 322 (e.g., start time, end time, or some combination thereof).

A displaying function 310 may enable one more comments 318 to be displayed in conjunction with the corresponding video file 322 or a selected portion of the corresponding video file 322. A sharing function 312 may enable one or more comments 318, a video file 322, a selected portion of a video file 322, or some combination thereof to be shared by a user on one or more social media platforms or systems. Both such functions 310, 312 may provide the corresponding functionality in any suitable manner.

Although the components and modules illustrated herein are shown and described in a particular arrangement, the arrangement of components, modules, or functions may be altered to process data in a different manner. In other embodiments, one or more additional components, modules, functions, data structures, data or the like may be added to the described systems 300, or one or more components or modules may be removed from the described system 300. Alternate embodiments may combine two or more of the described components or modules into a single component or module.

The functions or structures of a system 300 in accordance with the features and aspects disclosed herein may be distributed across a computing environment 100 as desired or necessary. Certain functions or structures may pertain to one or more servers 102, while other functions or structures may pertain to one or more clients (e.g., devices 108, 120, 122, 124, 126 connected to one or more servers 102 via a data communication network 116).

In accordance with the features and aspects disclosed herein, a system 300 may associate comments 318 with certain locations within a video file 322, which typically includes video and audio components, and cause these comments 318 to be provided to a social networking site or public forum site for posting. The system 300 may provide a link to the commented point in the video file that provides an iconic indication of such point. For example, the system may create the link including a thumbnail version of the video frame at the commented point. Thus, a user may place comments 318 within a video file 322, such as a video and accompanying audio presentation for example, at temporal points within the file 322 so that friends may see these comments 318 and also comment themselves. The link may be configured so that selection of the link by a user causes the video to play starting at or near the commented point instead of at the video's original inception point.

In operation, a user may be playing a video file 322 generated by an independent entity, yet still have the ability to incorporate or submit a comment 318 that may be published on a social media website where the user and the user's friends may view the video file 322 and associated comments 318. When the comment 318 is completed, the user may simply submit the comment 318 and it may be automatically associated with the video file 322.

Once associated, a comment 318 may remain to be presented to other users. Additionally, a brief clip of the video file 322 may be automatically published on the user's homepage of a social network. When friends visit the user's homepage, they may select the video file 322 and play the clip associated with the comment 318. They may also be able to play (e.g., see, hear) the entire video file 322 with other associated comments 318, whether the comments 318 come from other friends or anyone playing the video file 322.

Figure 4:
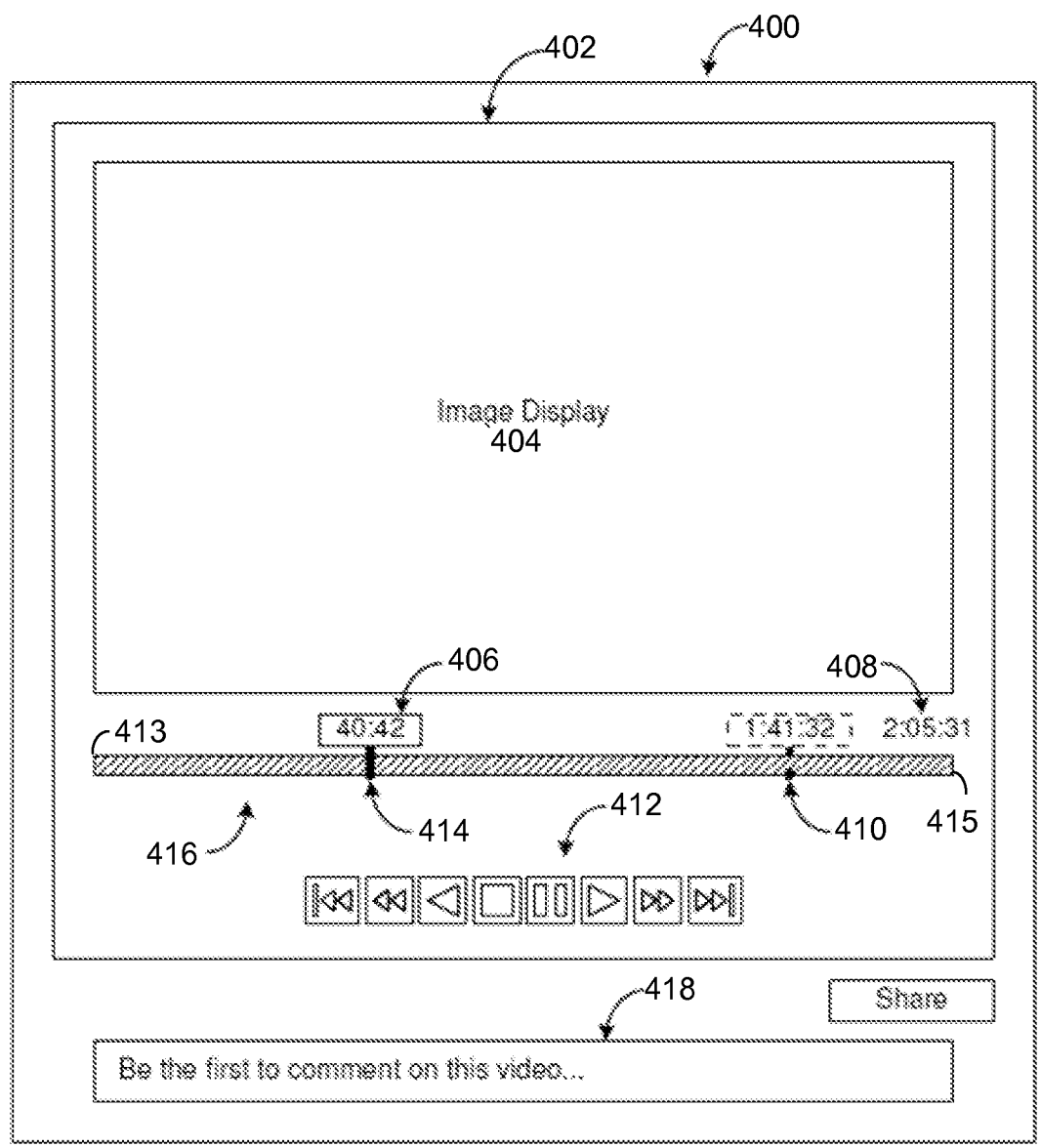
FIG. 4 is a diagram illustrating a simplified screenshot of a user interface enabling comments to be linked to selected portions of a video file.

Referring to FIG. 4, a system 300 in accordance with the features and aspects disclosed herein may provide or support a graphical user interface 400 that may be used to play (e.g., output a display based on a sequence of video data) a video file (e.g., the video file 322 shown in FIG. 3) and related data and provide comments (e.g., a comment 318 as referenced in FIG. 3) at specific points within the video file. Although represented diagrammatically by the outline 400, it should be appreciated that the graphical user interface 400 may be embodied as an input/output module executing on a client device that receives user input and generates responsive output. The user interface 400 may generate and output a window 402 to a display device. The window 402 may include an image display portion 404 displaying output frames of video data and a progress bar 412. The client device may generate the window 402 such that the progress bar 412 indicates a point in a video timeline corresponding to a current frame of the video file appearing in the image display portion 404. For example, a progress bar 412 may include a progress indicator 414 that automatically progresses (e.g., from left to right) during playing of a video file to indicate the current location temporal points (locations) of play and possible locations to leave a comment. The progress bar 412 may also indicate an inception point 413 and a termination point 415 representing times at which the video file in play begins and ends, respectively. In FIG. 4, the progress indicator 414 is depicted at location intermediate between the inception point 413 and termination point 415.

The user interface module 400 executing in the client device may control the progress indicator 414 so that it moves in response to user input to change the location of play or to select a location for leaving a comment 300. The client device may include a tool bar 412 or other control feature in the window 402 to enable a user to control playback of a video file, to jump to a temporal point within the video file, to indicate where a comment may be placed, or the like. A tool bar 412 may include convenient commands to play, pause, stop, reverse, fast forward, fast reverse, or the like or combinations or sub-combinations thereof.

In selected embodiments, the client device may provide a comment window 418 via the user interface 400 configured as an input object enabling users to add comments to a video file at specific temporal points, for example at an intermediate point indicated by the progress indicator 414 during play of video content. Using the comment window 418, an end user viewing a video file that is already produced and distributed to multiple users may associate comments or other data at any temporal point that the end user selects in a video file. Unlike conventional comment windows that merely allow users to associate general comments to a video file, selected embodiments in accordance with the features and aspects disclosed herein may enable users and their friends to input comments and to see the comments of others at specific temporal points throughout a video file.

The client device may configure the comment window 418 such that it supports various kinds of input. For example, in selected embodiments, the client device may configure the comment window 418 to receive typed or spoken (audio) input as text. In other embodiments, the client device may configure the comment window 418 to receive a link to a comment of some other form, for example, a comment in the form of an audio file, digital photograph, or other video data.

The client device may display a video portion of a video file in the image display portion 404, while a outputting corresponding audio portion of the video file synchronously on an audio output device, for example, speakers. The client device may indicate a temporal point of a currently displayed video and audio content in relation to the other content of a video file. When paused, a current video still frame may be shown, essentially freezing a video presentation, audio presentation, or both.

For example, a progress indicator 414 may indicate that a currently displayed video frame is temporally about one fourth of the way through a video file. In selected embodiments, a progress indicator clock 406 (e.g., 00:00:00, indicating hours, minutes, and seconds, respectively) may show the elapsed time between the beginning of the video file and the current temporal position (e.g., 00:40:42 in the illustrated embodiment) of the progress indicator 414. Also, a progress bar 412 may include a total length indicator 408 that indicates the total length of the video file currently being played (e.g., 2:05:31 in the illustrated embodiment).

In one embodiment, the client device may receive a comment as user input in a comment window 418, while playing a video file in a media playing and displaying a sequence of video frames in the image display portion 404. The client device may record the time at which a user begins to enter a comment, relative to the current video progress. Subsequently, the client device may detect an event indicating that the user has completed entry of the comment. For example, the user may select an icon or other object in the window 402, or enter a keystroke, or pause for more than a defined duration. In response to detecting completion of a comment, the client device may create a record in a database or other data structure associating the comment with an identifier for the video file and with a selected temporal point that is intermediate between the inception point 413 and termination point 415. The selected temporal point may be, for example, a time at which the client device first detected entry of the comment in the comment window 418 (a "comment start time"), or a time defined in relation with a comment start time or detected comment finish time, for example, a defined number of seconds (e.g., 3) prior to the comment start time. The client device may select the temporal point at an earlier time than the comment start time, setting the time back to associate the comment with an earlier temporal point of the video file. This may conveniently account for a lag time between when a user decides to leave a comment and the time the user actually takes to input the comment. Accordingly, a client device may relate a comment to a selected temporal point in the video file.

In another embodiment or situation, the client device may enable an end user to navigate a video file or to select a temporal point at which to associate a comment by selecting and moving the progress indicator 414. For example, the client device may receive user input from a pointing device or the like, indicating that the end user has selected the indicator 414 and moved it to a new position 410 along the progress bar 412. For example, a progress indicator 414 may be moved from a first position corresponding to a first time (e.g., 00:40:42) to a second position corresponding to a second time (e.g., 01:41:32). In response, a media player component on the client device may therefore advance or jump play of the video file to the second position (e.g., play may continue with the video and/or audio at the new location 410).

In selected embodiments, the client device may progress a sequence of video frame presented in an image display portion 404 in response to user input indicating movement of the progress indicator 414 to a new position 410 along the progress bar 412. Accordingly, a user may view images (e.g., video frames) associated with the changing temporal position within a video file before releasing the progress indicator 414. Alternatively, images may not be presented during movement of an indicator 414 until after the user releases the indicator 414 at the new location 410. In either case, a progress indicator clock 406 may communicate or display a time position within a video file.

Alternatively or in addition to the foregoing, a control palate 412 may be used to scan a video file to identify a location for playing the video file or for placing a comment. A video control tool bar 412 may include various interactive control objects, for example a stop button, pause button, play button, fast forward button, reverse button, rewind button, forward to the end button, and reverse to the beginning button. In certain embodiments, fast forward and rewind buttons may include multiple speeds.

For example, selecting a fast forward button once may cause a video file to play at twice a normal playback speed. Selecting the button additional times may increase the speed (e.g., four times, eight times, sixteen times, or the like). The same or similar functionality may be incorporated into a rewind button. Also, a user may advance or retreat through frames of the video file one frame at a time by selecting a pause button, then selecting a fast forward button or a reverse button, respectively. Any of the foregoing techniques may be used to sequentially scan the frames of a video file.

Figure 5:
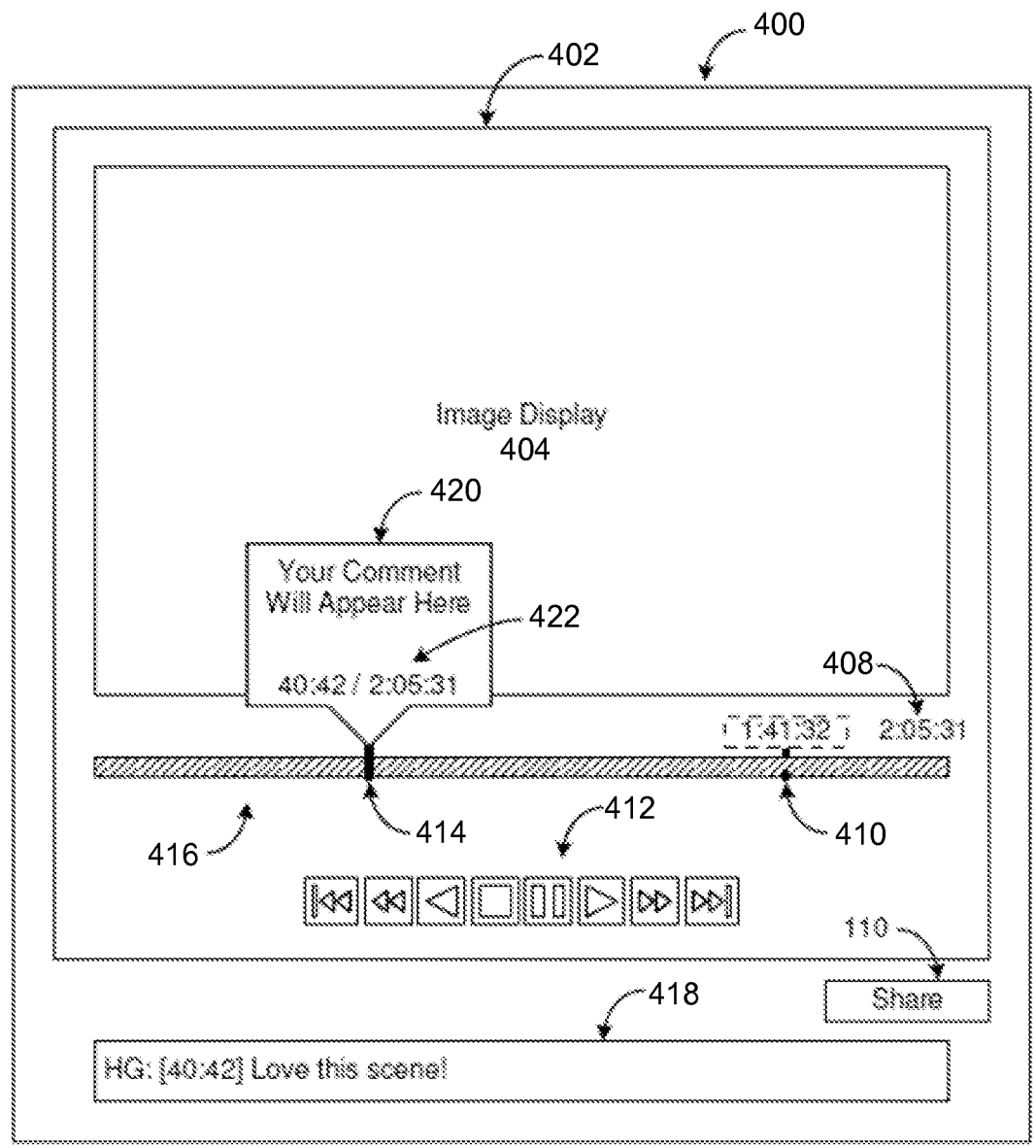
FIG. 5 is a diagram illustrating the screenshot shown in FIG. 4 of the user interface responding to receiving a comment from a viewer of the video file.

Referring to FIG. 5, in selected embodiments, a user interface 400 operating on a client device enables a user to enter comments into a comment space 418 while a media player component of the user interface plays a video, file or afterwards. The client device may generate a secondary window 420 presenting in response to receiving user input indicative of a user interest in adding a comment. In the illustrated example, a user "HG" has entered a comment comprising text reading "Love this scene!" in the comment window 418. In response, the client device may cause a secondary widow 420 to appear proximate to the progress bar 416 near the progress indicator 414 to indicate the place at which the comment would be placed. The secondary window 420 may further include a time comparator 422, indicating a current location of the proposed comment relative to the entire length of the video file. Such a comparator 422 may change as the user changes (e.g., selects and drags) the location of a comment along a progress bar 416.

A location along a progress bar 416 may automatically change when a user inputs a comment, optionally being set back for a period of time between one to ten seconds, for example. This may provide a logical location of a comment within a video file to account for a possible lag in the time for a user to input a comment 318 after a relevant portion of a video file has been experienced by the user. An indicator 420 may be moved from one place to another along a progress bar 416, possibly locating the comment at a new location 410.

In selected embodiments, once a comment has been input (e.g., typed into a comment window 418, uploaded in the form of an audio file, or the like), it may be shared. This may be accomplished in any suitable manner. For example, in certain applications (e.g., with certain settings selected or entered), a comment may be immediately or automatically shared in response to detecting entry of an "Enter" key press or the like on a keyboard. Alternatively, a comment 318 may be shared in response to detecting user selection of a "share" icon or button 424 based on input from a pointing device, or in response to any suitable defined event.

A share icon 424 may be used to initiate sharing of a video file (or portion thereof) and an associated comment on one or more social networking sites or online public forums. For example, in response to detecting user selection of a share icon 424, the client device may cause a secondary window to appear including a list of popular social networking Web sites from which to choose. In response to detecting a user selection or designation of a social networking site, the client device may provide the comment and a link to a video or portion thereof together with the temporal point associated with the comment for posting on a designated Web page, for example, a user home page, within the social networking site. For example, the client device may transmit the comment to a host server with an identifier for the video file and information defining the associated temporal point of the comment, for storage in a database or other data structure. Subsequently, the client device or host server may transmit the comment, video file and information defining the associated temporal point, or a link thereto, to the social networking site. Accordingly, the video file (or portion thereof), together with the comment of the user may be viewed by others (e.g., "friends" of the user designated within the social networking site), who may also comment on the video file themselves. In an alternative, the video link and comments may be similarly shared on a public forum website with no restrictions to a particular group of users.

Figure 6:
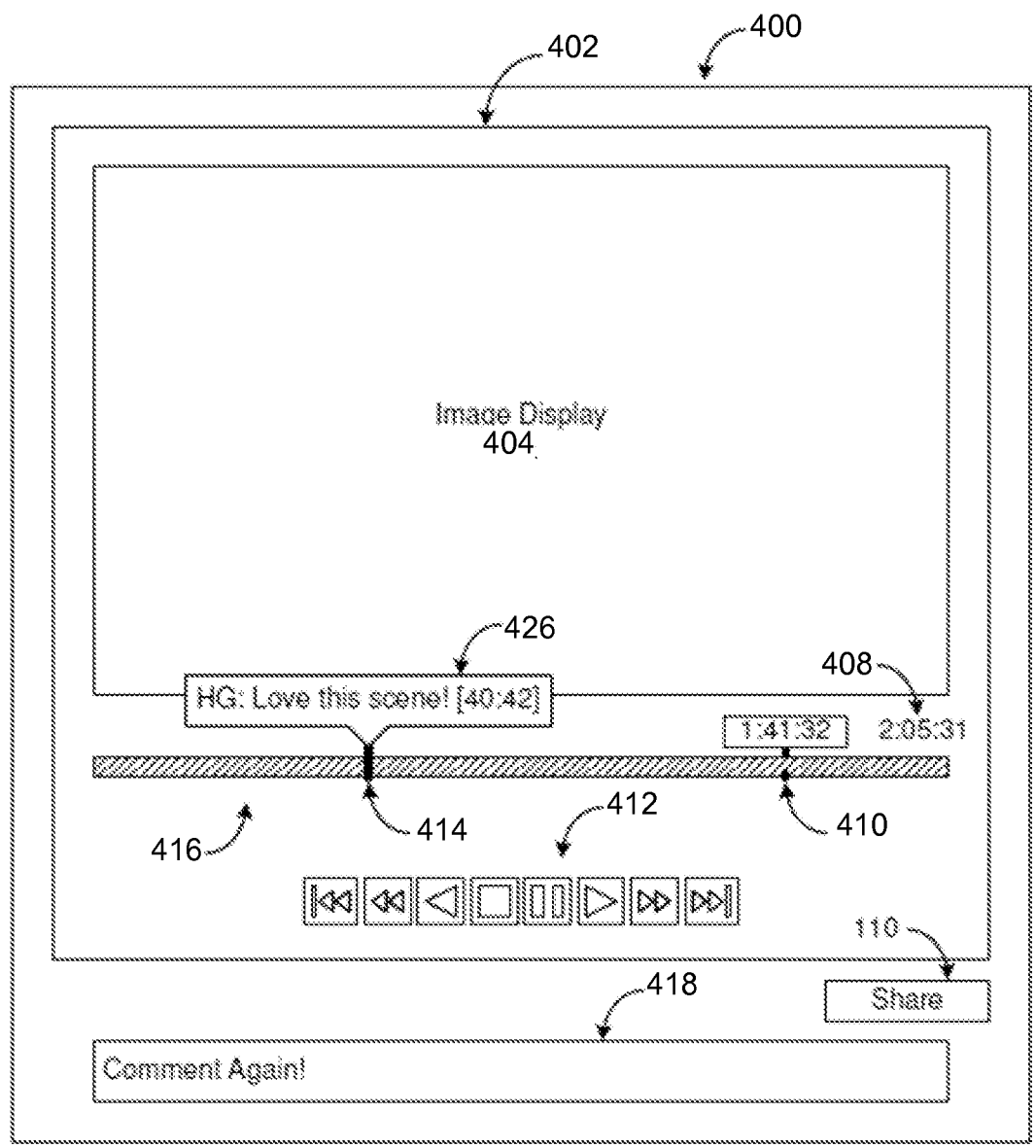
FIG. 6 is a diagram illustrating the screenshot shown in FIG. 4 of the user interface after the comment from the viewer has been uploaded or otherwise received.

Referring to FIG. 6, in selected embodiments, once a comment has been associated with a video file using a method as described herein, a client device subsequently playing the video file with an associated comment may generate a window 426 or similar data object at an appropriate time during play of the video. The window 426 may include comment data and indicate the location of the comment in the video file. The icon 426 may be positioned proximate to the progress bar 416 and point to the temporal point to which the comment is associated. In certain embodiments, the client device may enable a user that submitted the comment to change the associated temporal point by selecting a progress indicator 414, or a comment icon 426, and changing the location (temporal point) to another time. The user may then be invited to comment again, for example, text to that effect may be presented in a comment window 418.

Figure 7:
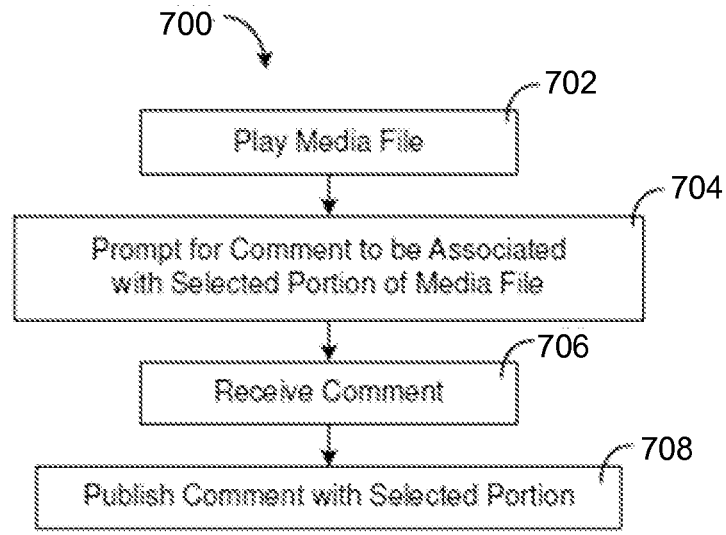
FIG. 7 is a schematic block diagram showing aspects of a method for linking comments to selected portions of a video file.

Referring to FIG. 7, in selected embodiments, a computer system in accordance with the features and aspects disclosed herein (e.g., a system 300) may perform or enable a comment-processing method 700. Such a method 700 may begin when a system plays 702 a video file. This may occur after a system has received a command or request from a user to play the video file. As the video file is played 702, the system may then prompt 704 the user to comment on the video file or a portion thereof. In response to such prompting 704, the system may receive 706 a comment from the user. The system may then publish 708 the comment together with the selected portion. In selected embodiments, such publishing 708 may occur after a system has first received a confirmation of authorization from the user to share or otherwise publish 708 the comment.

Figure 8:
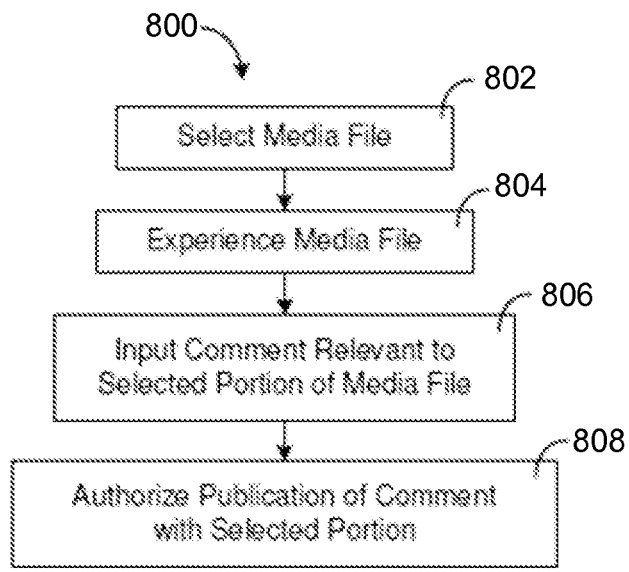
FIG. 8 is a schematic block diagram showing aspects of a method for commenting on a selected portion of a video file.

Referring to FIG. 8, in selected embodiments, a user of a computer system in accordance with the features and aspects disclosed herein (e.g., a system 300) may perform a comment-posting method 800. Such a method 800 may begin when a user selects 802 a video file. For example, a user may select 802 for viewing a video presented on a website. The user may then experience 804 (e.g., watch, listen to, or both) the video file or portion thereof.

While experiencing 804 the video file, or sometime thereafter, a user may input 806 a comment. Such inputting 806 may include selecting a location (temporal point) within the timeline of the video file to be associated with the comment. For example, a user may communicate a desired location for a comment by selecting a location on a progress bar 416. Alternatively, a location for a comment may be determined by simply starting to input a comment as a video file is playing. In such a case, the comment may be automatically linked (e.g., by default) with that portion of the video file playing at or about the time the comment was input 806.

The user may then authorize 808 a system to publish the comment with the corresponding or designated portion of the video file. For example, the user may authorize 808 the system to publish the comment on the website where the user selected 802 the video file. Alternatively, or in addition thereto, a user may authorize 808 or instruct a system to publish the comment and associated video file or portion thereof on a social networking site (e.g., on the homepage of the user within the social networking site). Accordingly, in authorizing 808 publication of the comment, the user may choose to share the comment and video file with others (e.g., the user's "friends" within the social network).

Figure 9:
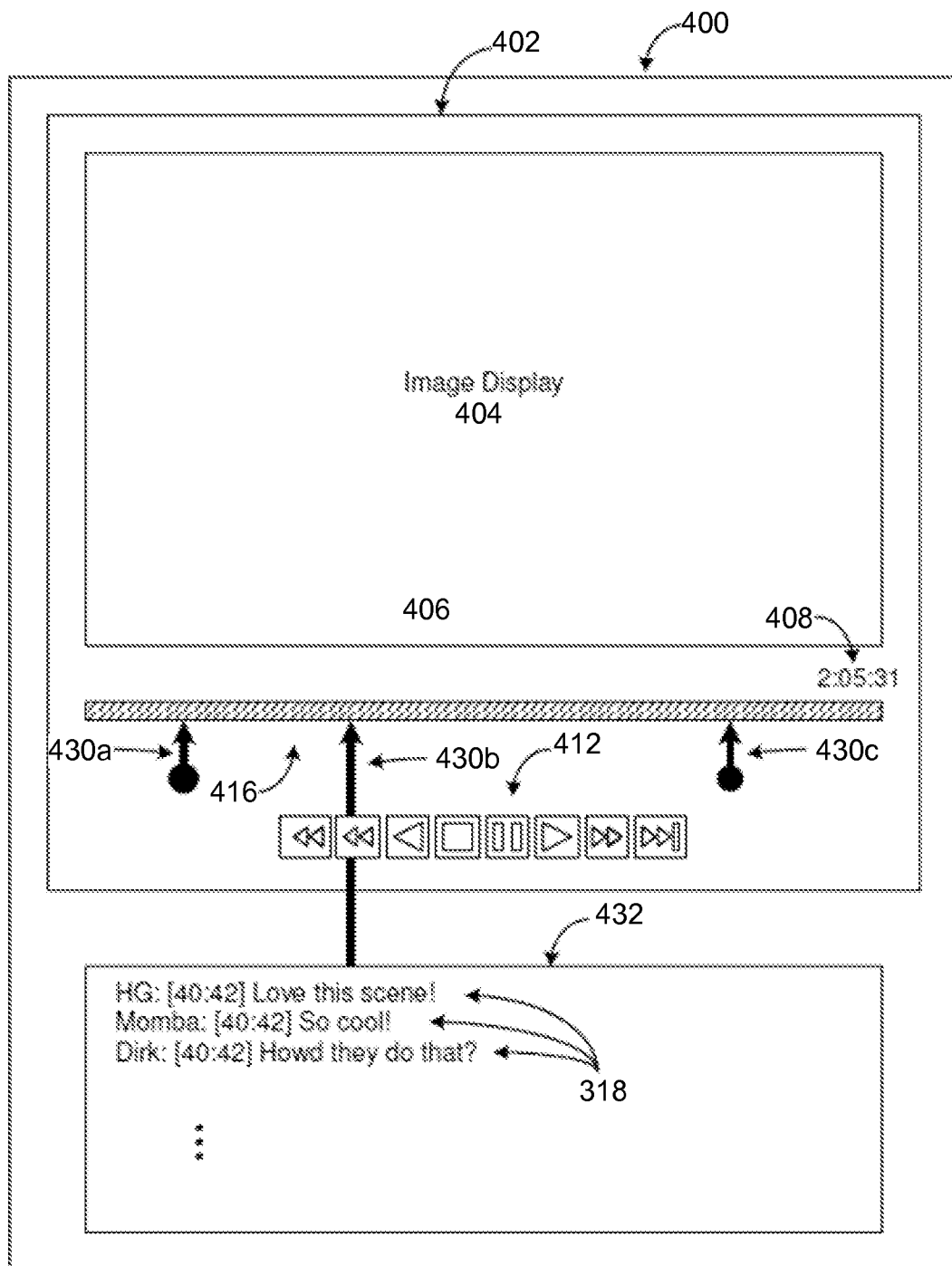
FIG. 9 is a diagram illustrating a simplified screenshot of a user interface providing or displaying a collection of comments corresponding to a selected portion of a video file.

Referring to FIG. 9, a comment 318 and associated video file (or portion thereof) may be shared or published in any suitable manner. In selected embodiments, comments 318 may appear together including comments from one or more other users associated with a common temporal point during play of the video. For example, in certain embodiments, a user interface 400 may include a comment display 432 that displays one or more comments 318 left by users, including the corresponding user names. These comments 318 may be grouped in various ways based on a set of one or more associated temporal points in the video, wherein each group of comments is associated with one of the temporal points. In an aspect, the client device may provide output in the window 402 identifying various time points associated with respective groups of comments 318.

For example, in the illustrated embodiment, time points where comments 318 have been made are identified with a pointer 430b in relation to the progress bar. The comment display 432 corresponding to one of the pointers 430a, 430b or 430c may be expanded for viewing of comments in response to detecting user selection of a pointer. For example, in response to detecting selection of the pointer 430b located at time 40:42, the client device or a server may cause the associated comments 318 to appear in the window 432. Other pointers 430a, 430c may be included in the display windows 402 indicating other locations in the video file where other comments are associated, and will be output in the window 432 in response to selection of a corresponding one of the other pointers 430a, 430c. In selected embodiments, a pointer 430a, 430b, 430c may be highlighted, delineated, or otherwise expanded to draw attention when the current time of the video play passes over the pointer by the client or host device.

Figure 10:
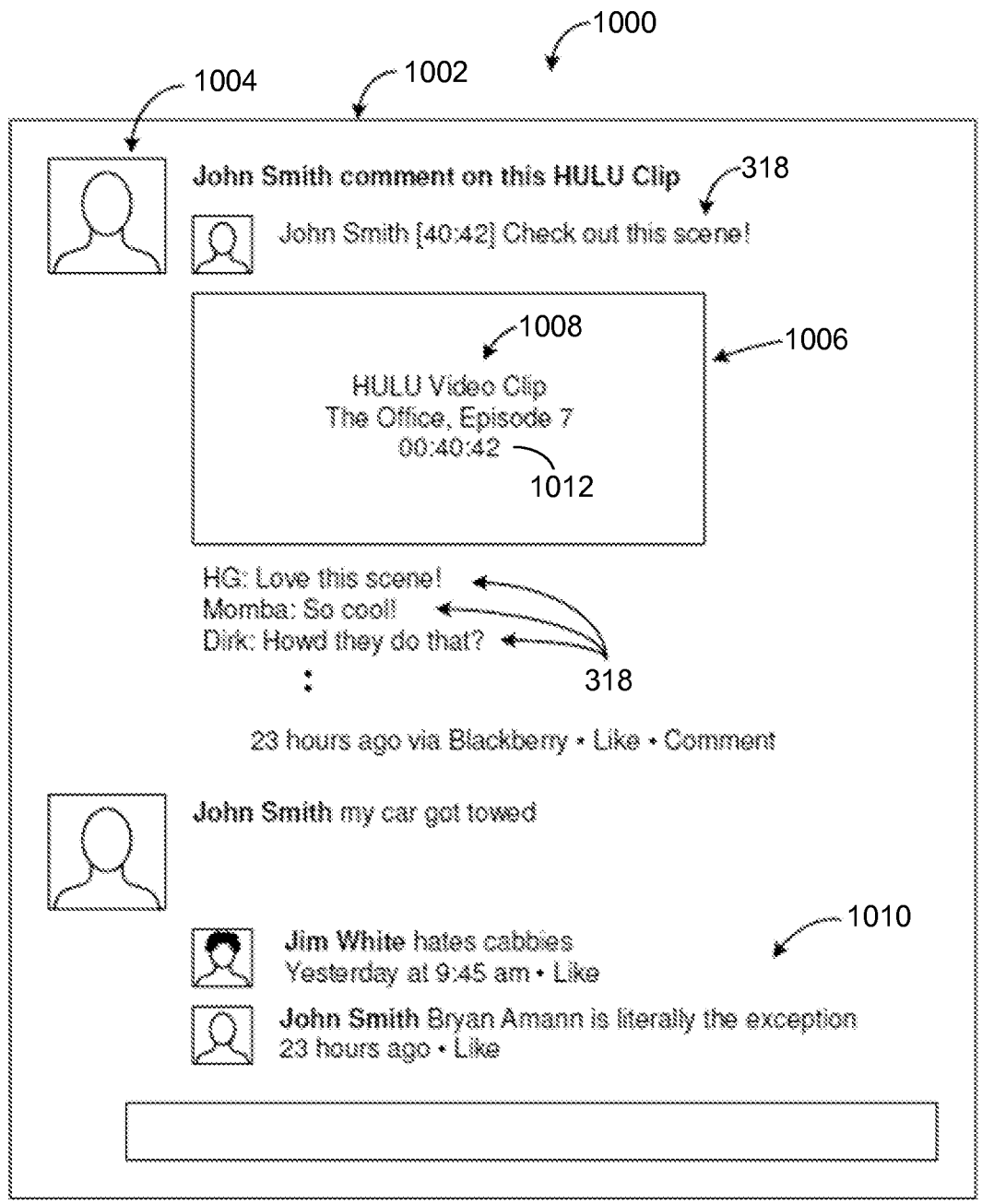
FIG. 10 is a diagram illustrating a simplified screenshot of a social media page presenting a video file or portion thereof associated with selected comments.

Referring to FIG. 10, a comment 318, an associated video file (or portion thereof), or both may be shared with or published on a social networking site in any suitable manner. For example, in certain embodiments, a host server may, in response to a signal from a client device, automatically create a "hashtag" for the comment on a social networking site such as TWITTER™ for example, including an indication of the temporal point of the video associated with the comment, and publish the hashtag to the TWITTER™ website. Alternatively, or in addition thereto, comments 318 may appear within a forum type of social networking site wherein users post comments 318 left by themselves and designated other members of a social network. The simplified screenshot 1000 provides one example of how a comment 318 associated with a defined temporal point in a video file may be published on a social networking site.

For example, in response to receiving user input requesting that an associated comment be shared with a designated social networking site, a host may publish a video file or portion thereof (e.g., a link to a video clip 1006) on a homepage 1002 of the user within the social network. A photo 1004 of the user submitting the comment may appear next to any comments 318 or other posts made on the user's homepage 1006. Information 1008 relating to the video file may identify a source or origin of the video file. For example, information 1008 presented may identify the source of the video clip 1006 as HULU™. The information 1008 may further identify a name of the video file, the temporal point 1012 to which the comment pertains, and other comments 318 from the user's friends or others that are also associated with the same video file or the same portion or temporal point of the video file. Other related or unrelated comments 1010 may be presented on the homepage 1002 as usual. In an aspect, the system may configure the link 1008 as a thumbnail image taken from the video clip at the indicated time point 1012; for example, at 00:40:42. In another aspect, the system may configure the link so that when selected, the video is streamed to appear in the page 1002 starting at the indicated time point 1012.

In certain embodiments, a video clip 1006 may appear on the user's homepage 1002 together with the comments 318 and other information 1008. The size of the clip 1006 may be determined by a predetermined time frame, a predetermined number of video frames, a predetermined segment defined by preselected portions of the underlying video file, or by other methods. In response to the user relocating the temporal point to which a comment is associated, the system may adjust the beginning and endpoints of the clip 1006. As discussed above, if a system 300 automatically locates the placement of a comment 318 within a video file, and optionally self-adjusts the comment 318 to be located at an earlier point in time, three to five seconds earlier for example, then the endpoints of a clip 1006 may also be moved to capture a relevant portion for posting on a user's homepage 1002.

Figure 11:
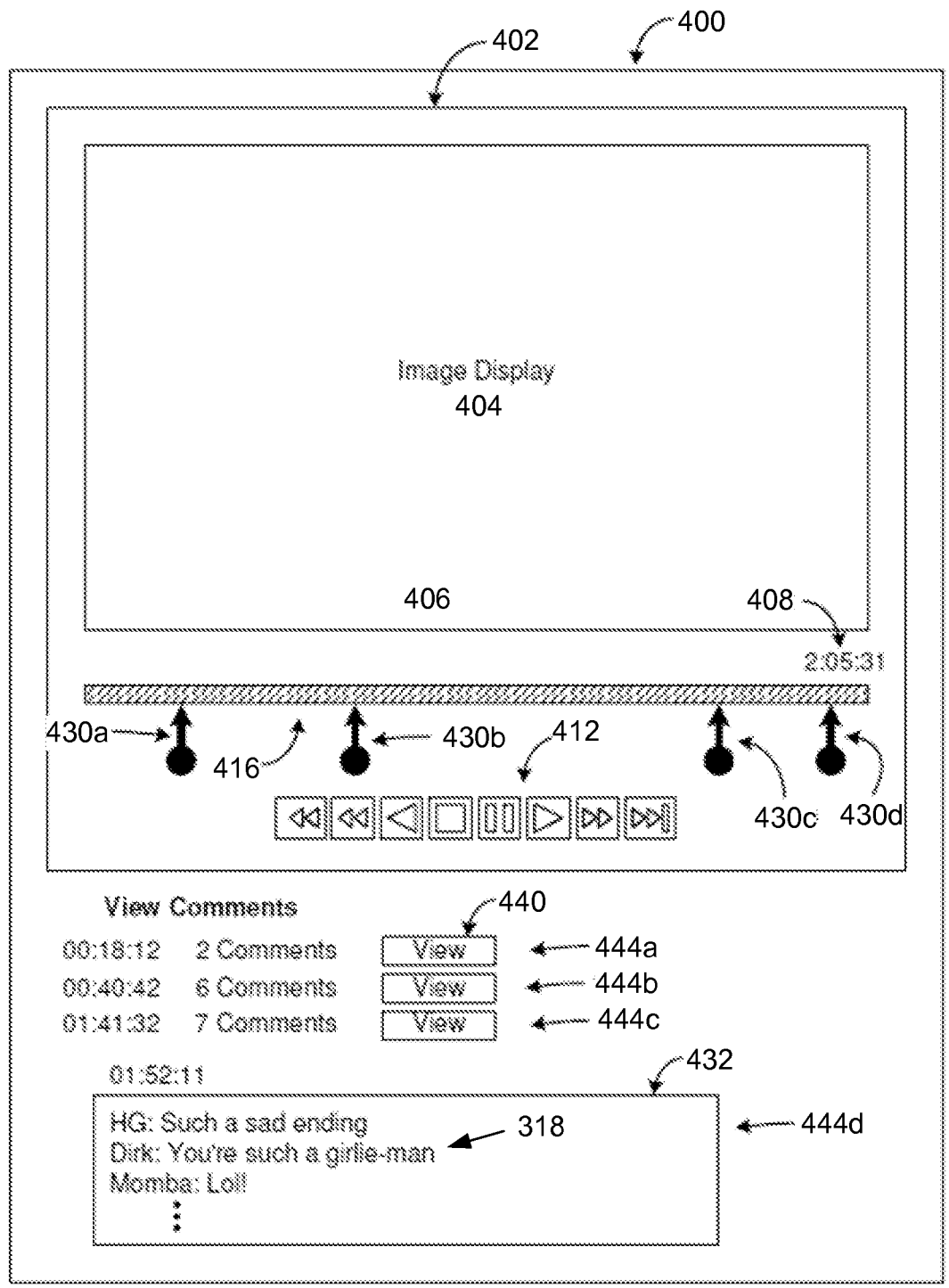
FIG. 11 is a diagram illustrating a simplified screenshot of a user interface providing or displaying a collection of comments corresponding to a selected portion of a video file.

Referring to FIG. 11, in certain embodiments, various pointers 430*a*, 430*b*, 430*c*, 430*d* may correspond to respective groups 444*a*, 444*b*, 444*c*, 444*d* of comments 318. Each group 444*a*, 444*b*, 444*c*, 444*d* of comments 318 may correspond to a different time on a progress bar 416 and be accompanied by a button 440 or similar interactive object for accessing the comments 318. When such a button 440 is selected, the system may display corresponding comments 318 in an expanded window 432. The system may collapse the window 432 when another group 444*a*, 444*b*, 444*c*, 444*d* of comments 318 is selected and replace it with an alternative window with a different group of comment. In an alternative, or in addition, to system may open or close multiple windows like window 432 independently in response to separate user input.

As a video file is played, the system may display or output comments 318 at their respective associated temporal points in the video file. Accordingly, a user may see or hear comments 318 at each location. For example, the system may display a comment window 432 when the time point of the video file associated with the comments 318 is reached, enabling the viewer/listener a chance to review the comments 318 while playing the video file.

The system may provide a period of time over which comments 318 (e.g., textual comments) remain after the moment or point in time in which the comment 318 first appears. This may allow sufficient time for a viewer to read the comments. If there is a long list of comments pertaining to a particular point in time, more time may be allocated so that a viewer may read all of the comments. For example, there may be a predetermined amount of time allotted for each individual comment left at a particular point in time. Alternatively, time may be allotted based on the total number of words that make up all comments, giving a more granular metric from which to set a viewing period for each comment window 432.

In embodiments permitting submission of comments in an audio file format, each comment may be played along with the corresponding video file. Accordingly, a viewer/listen of the video file may hear the various comments that have been uploaded to the system at an associated temporal point in the video file. When more than one comment in audio format has been submitted for a particular point in time, those comments may be played sequentially (e.g., in the order received) with or without some overlap. In selected embodiments, the volume applied to such audio comments may be somewhat lower than the volume applied to any audio originating with the video file itself. Accordingly, the comments 318 in audio format may be heard much like impromptu comments of an audience at a movie, presentation, or the like, at user-selected points throughout the duration of play of a video file.

After sufficient time has passed for reading of all relevant textual comments 318, the corresponding comment window 432 may close, reduce in size, or be replaced by another window 432 in response to play of the video file reaching a later temporal point associated with another set of one or more comments. Also, if a viewer moves a progress indicator 414, the system may display or audibly output the comments 318 in a compressed time format as the indictor 414 is moved.

For example, when a progress indicator 414 is being moved by a user, a comment window 432 may be presented for a time interval that is shorter than the interval that would be used if the video were playing at normal speed.

The system may incorporate comments with digital video data in a video file in parallel tracks or layers. For example, after receiving comments a host server may generate a Flash™ overlay including the comments with the video file, such that when the video file is subsequently played, the comments automatically appear for a limited period of time, or are played, as each temporal point is reached. In an alternative approach, a system may monitor progress of play of a video file, and based on a comment data record created for the video file, output comments associated with respective temporal points in the data structure as progress of play reaches each respective temporal point.

In selected applications, the comments 318 may be presented without regard to whether the comments 318 originated with a particular user or a friend of that user. In other applications, only user within a particular group may be presented with selected comments 318 (e.g., comments 318 input by members of that group). Thus, groups may be partitioned within a social network, where subsets of users or subsets of a user's friends may be partitioned apart for different reasons. For example, recreational groups, professional groups, family groups, or other groups of like-minded users may be treated differently in establishing viewership and access criteria with respect to comments 318 linked to a video file.

In certain embodiments, certain users may be given priority over other users. For example, it may be desired in a video file to have a director's commentary where a director may input thoughts on a scene or point in a video file. Here, it may be in everyone's interest (e.g., the author of the video file, the provider of the presentation, the user or friends, and the top ranking person as well) to give these types of comments 318 priority, enhancing the viewing experience, etc.

Once comments 318 are established on a video file, the system may identify points in a video file that have the most comments 318. The system may highlight a temporal point in the video file based on a number or other quantity (e.g., total words or length) of associated comments. For example, playlists may be created around moments in a video file, themes, common occurrences and other events.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Client-Side Operations and Apparatus

Figure 12:
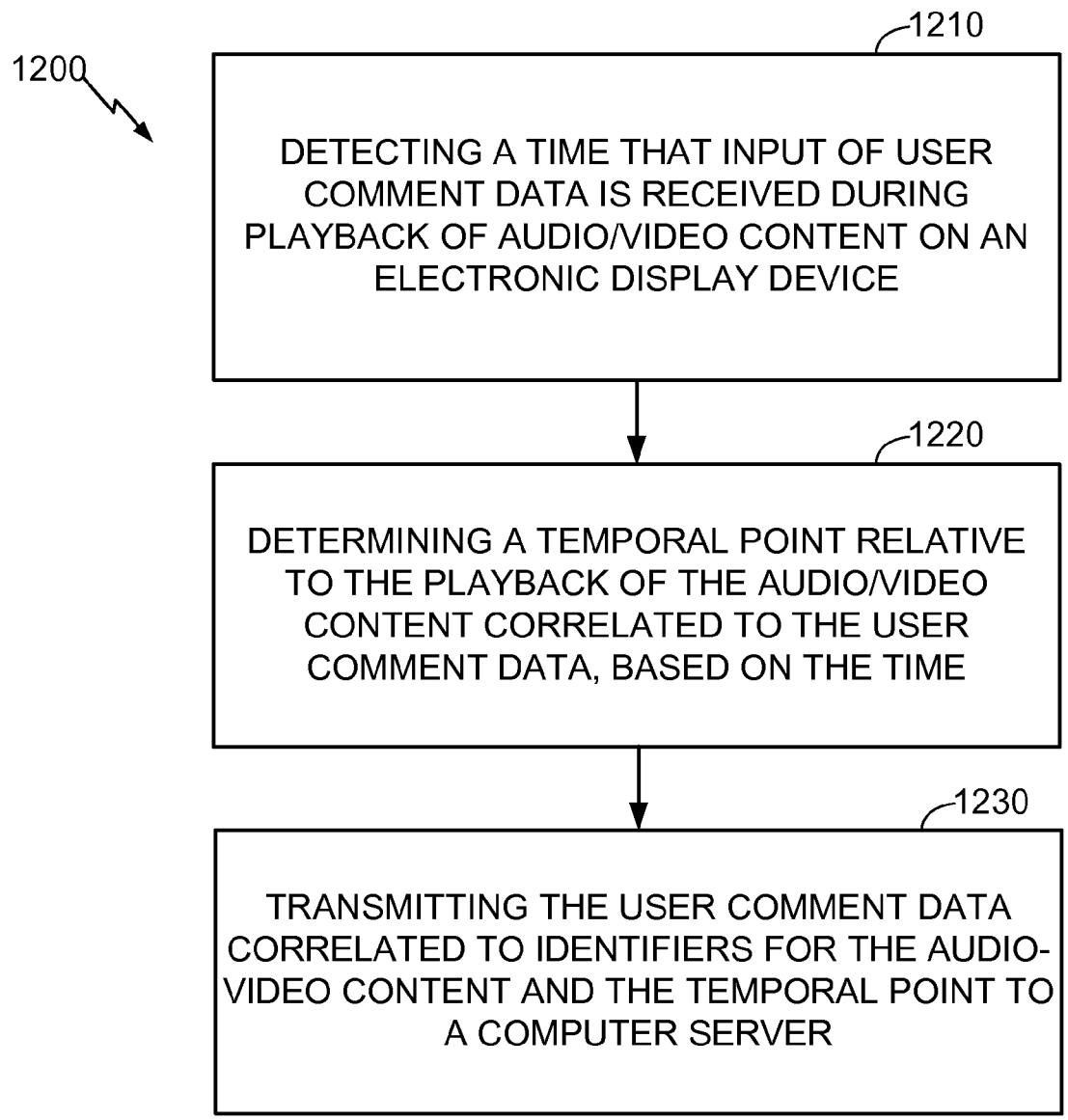
FIGS. 12-14 are diagrams illustrating operations that may be performed by a client device in connection with configuration and distribution of a user comment correlated to a user selected temporal point of video data.

A method 1200 shown in FIG. 12 may be performed by a client device for providing user comment data correlated to a temporal point in playback of audio/video content. The method 1200 may include, at 1210, detecting a time that input of user comment data is received during playback of audio/video content on an electronic display device. The time may be determined relative to an inception time of the video data, and may be based on a current frame pointer relative to a video timeline. The time should be related to the video timeline. For example, the client device may monitor a current time or frame pointer of a video file, and copy such value to a temporary memory location in response to detecting input of user comment data via a designated user interface. Detecting the time may be based on a time that input of the user comment data is initiated. In the alternative, detecting the time may be based on a time that input of the user comment data is completed, or at some other time based on the input of user comment data.

The method 1200 may further include, at 1220, determining a temporal point relative to the playback of the audio/video content correlated to the user comment data, based on the time detected at block 1210. The temporal point may be that location on the video timeline that the comment should appear during a subsequent playing of the video file or portion thereof. In an aspect, the temporal point is located at some time, or at any selected time, after inception (zero) on the video timeline and before the terminal time at which the video is terminated. In other words, at some intermediate point in the video timeline. The client device may determine this time using any suitable algorithm, for example, subtracting a lag period (e.g., 3 seconds) from the time detected at 1210, equating the temporal point to the detected time, or by some other algorithm depending on the design of the user interface for collecting comments and how the time of receiving the comment data is determined.

The method may further include, at 1230, transmitting the user comment data correlated to identifiers for the audio-video content and the temporal point to a computer server. This operation may enable sharing of the comment data with another person viewing the video output from the video file at a later time. The identifier for the video file may be, or may include, a unique name or code used for identifying the video file in a database accessible to the computer server. The identifier for the temporal point may include, for example, a time designation based on a timeline of the video file, or a frame designator (e.g., Xth out of Y frames). The client device may further transmit an identifier for a user account operating the client device when the comment data is received to the computer server, along with instructions for publishing the comment on one or more Web sites.

It should be appreciated that the operations described in connection with block 1210, 1220, 1230 of the method 1200, or other operations of the method 1200, may involve operations of a computer server to the extent that the client device is operating as a dumb terminal or portal to a process occurring at a different computer server. Various distributions of these operations may be implemented between a client device and host device, without departing from the scope of the method 1200. In an aspect, the method 1200 may include providing data for a user interface, including control objects for the playback of the audio/video content and entry of the user comment data, to the electronic display device. Various examples of resulting user interfaces and control objects are shown in described in connection with FIGS. 4-6, and any suitable method of generating data for such objects in the applicable computer operating system may be used.

Figure 13:
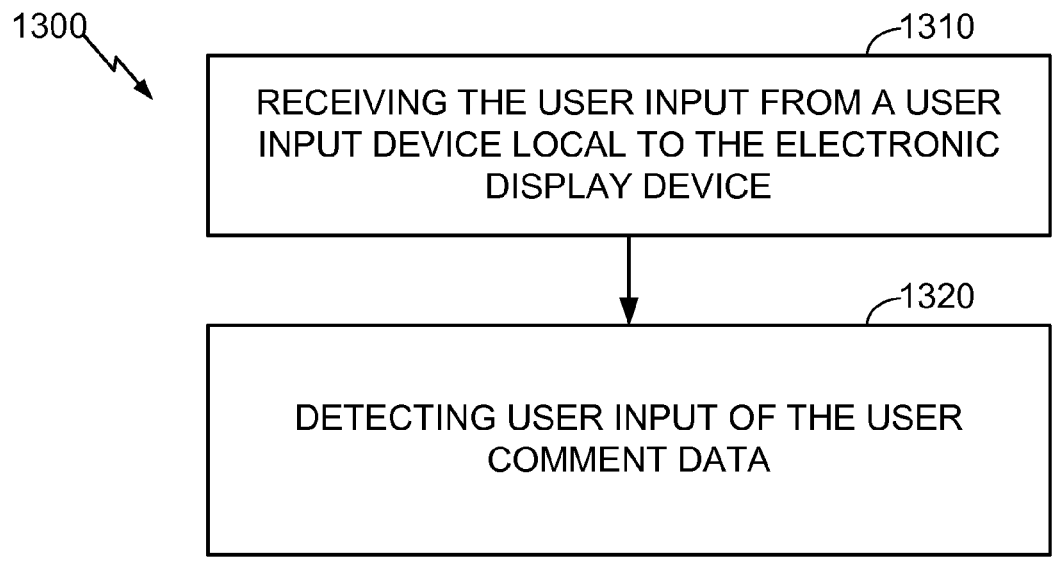
Figure 14:
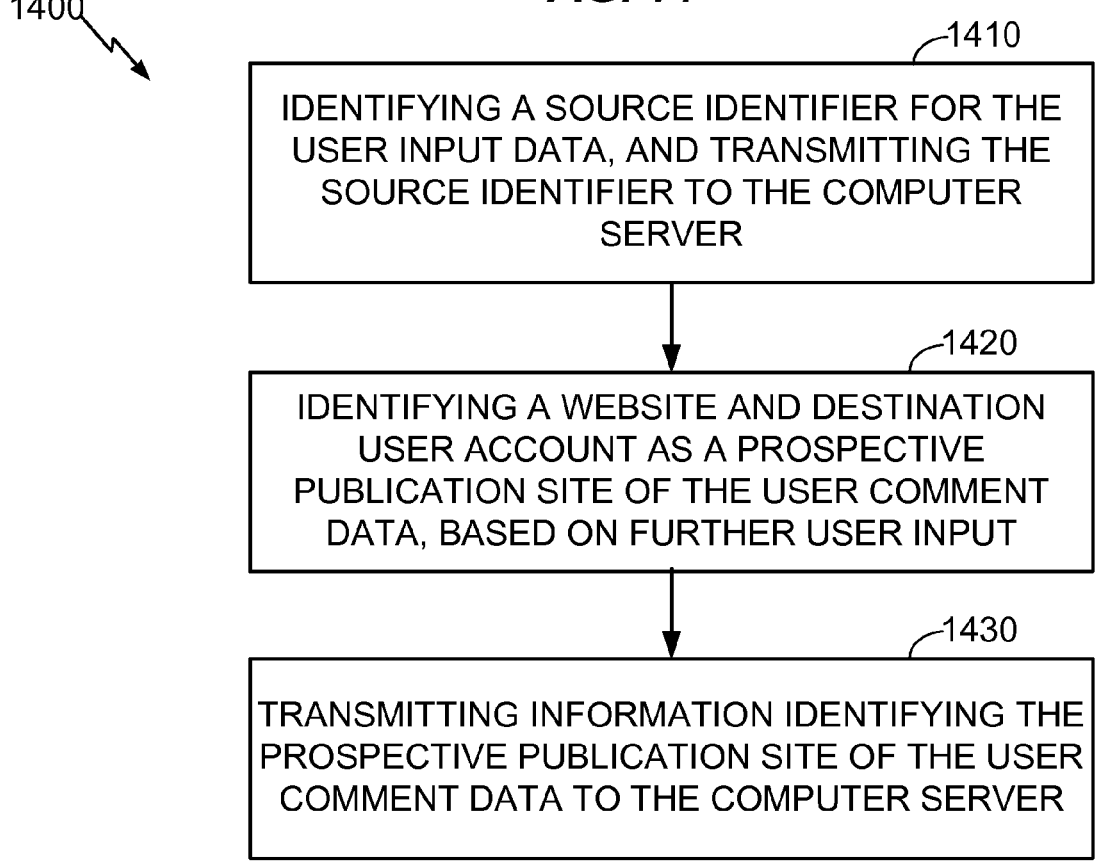

With reference to FIGS. 13-14, several additional operations 1300, 1400 are depicted for providing user comment data correlated to a temporal point in playback of audio/video content, which may be performed by a client device, alone or in combination with a server. One or more of operations 1300, 1400 may optionally be performed as part of method 1200. The elements 1300, 1400 may be performed in any operative order, or may be encompassed by a development algorithm without requiring a particular chronological order of performance Operations can be independently performed and are not mutually exclusive. Therefore any one of such operations may be performed regardless of whether another downstream or upstream operation is performed. For example, if the method 1200 includes at least one of the operations 1300 or 1400, then the method 1200 may terminate after the at least one operation, without necessarily having to include any subsequent downstream operation(s) that may be illustrated.

In one embodiment with reference to FIG. 13, the method 1200 may further include, at 1310, the client device receiving the user input from a user input device local to the electronic display device. For example, the client device may receive comment data as keyboard input interpreted as text data, as an audio signal, or as an audio signal that is processed using a speech-to-text algorithm to provide text data. The receiving of the user input should occur via an interface for displaying video output, for example via a user interface 400 as shown in FIGS. 4-6. The method may further include, at 1320, detecting user input of the user comment data. In an aspect, this may include the client device or host system recognizing that certain user input is intended as comment data. Such recognition may be accomplished, for example, by providing a specific object (e.g., a comment window) for entry of comment data, or by using a reserved input code (e.g., #comment# or spoken word "comment") to indicate inception of a comment, or by any other suitable method.

In other aspects with reference to FIG. 14, the method 1200 may further include, at 1410, identifying a source identifier for the user input data, and transmitting the source identifier to the computer server. For example, the client device may use a login sequence, cookie, or combination to identify a user account for a session in which commenting is performed. The source identifier may be, or may include, a user account identifier, such as, for example, an account name or account number. When a comment is received and transmitted to a host server, or at another appropriate time, the client device may identify a source user account that was active when the comment data was received, which may be assumed to be the comment source. The method 1200 may further include, at 1420, identifying a website and destination user account as a prospective publication site of the user comment data, based on further user input. For example, the user may indicate that the comment data should be published at a particular social networking site or public forum site. The client may designate a user account to which she is authorized to publish at the site. In an alternative, the host system may retain information identifying the source user account with authentication information provided by the user, if required, to publish the comment data with associated video data at a designated publication site. The method 1200 may further include, at 1430, transmitting information identifying the prospective publication site of the user comment data to the computer server. In an alternative, the prospective publication site may be determined by implication, or by a default setting.

Figure 15:
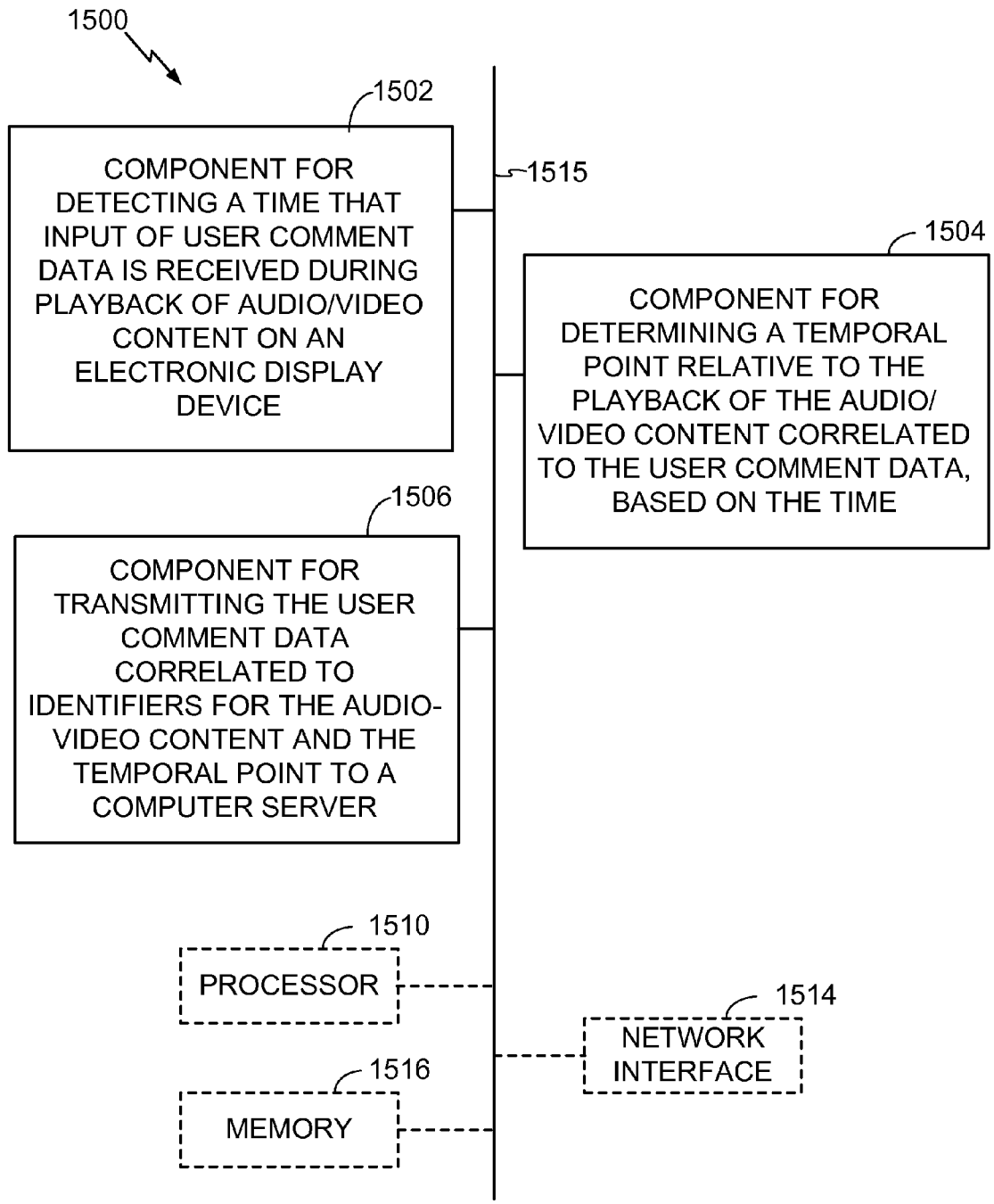
FIG. 15 is a diagram illustrating a client apparatus configured for distribution and configuration of a user comment correlated to a temporal point of video data.

With reference to FIG. 15, there is provided an exemplary apparatus 1500 that may be configured as client device, computer server or combination of client and server, for providing user comment data correlated to a temporal point in playback of audio/video content. The apparatus 1500 may include functional blocks that can represent functions implemented by a processor, software, or combination thereof (e.g., firmware).

As illustrated, in one embodiment, the apparatus 1500 may include an electrical component or means 1502 for detecting a time that input of user comment data is received during playback of audio/video content on an electronic display device. For example, the electrical component or means 1502 may include at least one control processor 1510 coupled to a memory component 1516. The control processor may operate an algorithm, which may be held as program instructions in the memory component. The algorithm may include, for example, incrementing a time variable initialized at inception of playing a video file, detecting a data signal from a user input device designated as comment data, and in response to detecting the signal, storing a current value of the time variable in a memory with a link or association to the comment data. Time may be measured in seconds, video frames, or other units.

The apparatus 1500 may further include an electrical component or module 1504 for determining a temporal point relative to the playback of the audio/video content correlated to the user comment data, based on the time. For example, the electrical component or means 1504 may include at least one control processor 1510 coupled to a memory component 1516. The control processor may operate an algorithm, which may be held as program instructions in the memory component. The algorithm may include, for example, determining a time offset value. Determining a time offset value may include, for example, retrieving a fixed value from a memory, or calculating a variable time offset value based on one or more characteristics of the comment data. The algorithm may further include, for example, subtracting or adding the time offset value to the time detected by module 1502.

The apparatus 1500 may further include an electrical component or module 1506 for transmitting the user comment data correlated to identifiers for the audio-video content and the temporal point to a computer server. For example, the electrical component or means 1506 may include at least one control processor 1510 coupled to a memory component 1516. The control processor may operate an algorithm, which may be held as program instructions in the memory component. The algorithm may include, for example, determining a network address of the computer server for transmitting the user comment data, configuring an electronic message (e.g., TCP/IP) including the comment data and identifiers for the audio-video content and the temporal point, addressing the message, and providing the message to a router via a network interface component 1514.

The apparatus 1500 may include similar electrical components for performing any or all of the additional operations 1300, 1400 described in connection with FIGS. 13-14, which for illustrative simplicity are not shown in FIG. 15.

In related aspects, the apparatus 1500 may optionally include a processor component 1510 having at least one processor, in the case of the apparatus 1500 configured to include a processor for a client device. The processor 1510 may be in operative communication with the components 1502-1506 or similar components via a bus 1512 or similar communication coupling. The processor 1510 may effect initiation and scheduling of the processes or functions performed by electrical components 1502-1506.

In further related aspects, the apparatus 1500 may include a network interface component 1514 enabling communication between a client and a server. The apparatus 1500 may include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for implementing the processes and behavior of the components 1502-1506, and subcomponents thereof, or the processor 1510, or the methods disclosed herein. The memory component 1516 may retain instructions for executing functions associated with the components 1502-1506. While shown as being external to the memory 1516, it is to be understood that the components 1502-1506 can exist within the memory 1516.

Video Host Server Operations and Apparatus

Figure 16:
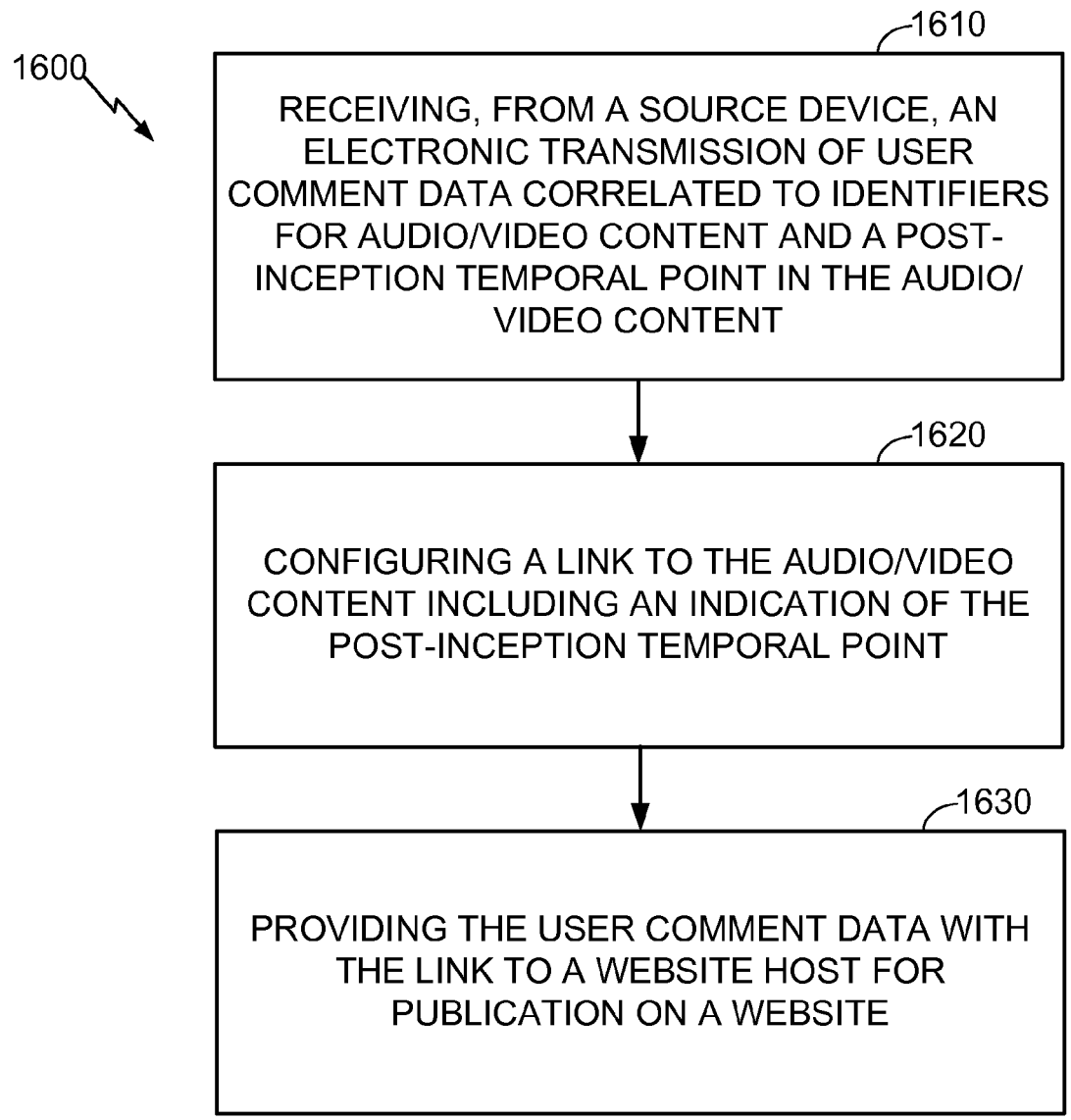

Comment data and associated temporal point and video file identifiers provided via a client device in response to user input may be further processed by a system component, for example by a computer server. As shown in FIG. 16, the computer server may perform a method 1600 for providing a link to digital audio/video content responsive to user comment data. The method 1600 may include at 1610, receiving, from a source device, an electronic transmission of user comment data correlated to identifiers for audio/video content and a post-inception temporal point in the audio/video content. For example, a user comment may be related to a particular video file using a video file identifier from an index or the like, and provided with time data indicating a temporal point in video data. As noted in connection with the method 1600 and elsewhere, the temporal point may indicate any point of a timeline for the video file intermediate between the timeline's inception and termination.

The method 1600 may further include, at 1620, configuring a link to the audio/video content including an indication of the post-inception temporal point. For example, the server may generate a text label, thumbnail graphic label, or combination thereof, that indicates both an identity of the video file and the temporal point associated with the label. An example is provided at 1006 of FIG. 10. The server may couple an HTML, XML, or other link including a network address with the label in a web page object or the like. The server may select the network address locating an application that is capable of receiving identifiers for the video file and the temporal point, and serving a video clip or streaming video content based on the identifiers. For example, the application may serve the video content initiated at the temporal point. The server may configure the application by providing the video file in a data structure such that it can be accessed by the application.

The method 1600 may further include, at 1630, providing the user comment data with the link to a website host for publication on a website. In an alternative, the server may provide the link without the user comment data to the website host. In these alternative embodiments, the user comment data may be retained with the audio/video content at a host server separate from the website host. More detailed aspects of the providing 1630 are described elsewhere herein, including in connection with FIG. 18 below.

With reference to FIGS. 17-19, several additional operations 1700, 1800 and 1900 are depicted for providing a link to digital audio/video content responsive to user comment data, which may be performed by a computer server, alone or in combination with a client device and/or another server. One or more of operations 1700, 1800 and 1900 may optionally be performed as part of method 1600. The elements 1700, 1800 and 1900 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1600 includes at least one of the operations 1700, 1800 and 1900, then the method 1600 may terminate after the at least one operation, without necessarily having to include any subsequent downstream operation(s) that may be illustrated.

In one embodiment, with reference to FIG. 17, the method 1600 may further include, at 1710, generating a thumbnail image from a video frame indicative of the post-inception temporal point of the audio/video content. For example, the server may select a frame of the video file corresponding to the temporal point, and then generate a thumbnail image based on the selected frame, using any suitable graphic processing technique for shrinking a digital image. The method 1600 may further include, at 1720, configuring the link to include the thumbnail image, for example by configuring the thumbnail image as an icon or other interactive object that in response to user input of a specified type activates the associated link.

With reference to FIG. 18, the method 1600 may further include, at 1810, receiving an identifier for the website host as a prospective publication site of the user comment data from the source device. The server may determine the identity of the website based on selection data supplied by the client device with the comment data, for example selection data indicating a website selected by the user who provided the comment data. The server may provide the user comment data with the link to a website via an Application Programming Interface (API) or other interface for publishing user postings in a designated location. The method 1600 may further include, at 1820, receiving an identifier for a destination user account at the website host from the source device, and providing information identifying the destination user account to the website host. The server may include with the comment data and link provided to the publication site information identifying a user account, topic, and/or other parameter. The website publishing the link and comment data may use the user account, topic, and/or other parameter to select a web page and/or configuration in which to publish the user comment data with the link.

With reference to FIG. 19, the method 1600 may further include, at 1910, providing the audio/video content to the website host, which may in turn serve the audio/video content to client devices that activate the link. In an alternative, perhaps more generally applicable approach, the server may refrain from providing the audio/video content to the website host, and may instead serve the audio/video content directly to client devices that activate the link published on the website. In some embodiments, the audio/video content may include the comment data, for example in an overlay or parallel track. In such embodiments, the server may refrain from providing the comment data to the website host, and may instead serve the audio/video content including the comment data directly to client devices that activate the link published on the website.

The method 1600 may further include, at 1920, truncating the audio/video content based on the post-inception temporal point to provide truncated audio/video content, e.g., a video clip. As described herein above, the server may select the beginning and terminal times of the video clip based on the temporal point. The method 1600 may further include providing the truncated audio/video content (e.g., video clip) to the website host. In an alternative, the video clip and/or comment data may be retained by a data server apart from the website host.

Figure 20:
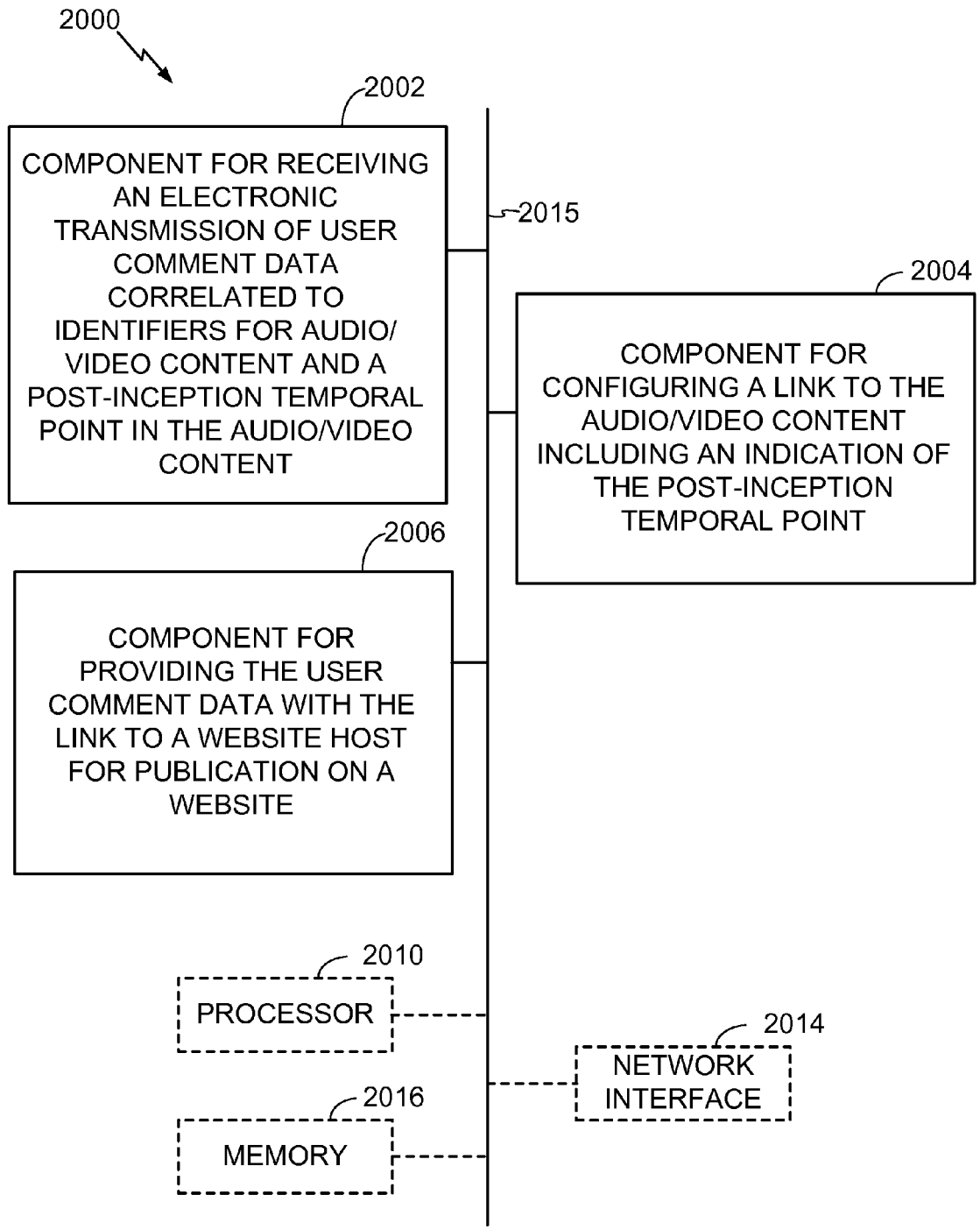
FIG. 20 is a diagram illustrating a server apparatus configured for publishing a user comment correlated to a temporal point of video data.

With reference to FIG. 20, there is provided an exemplary apparatus 2000 that may be configured as computer server, client device, or combination of client and server, for providing a link to digital audio/video content responsive to user comment data. The apparatus 2000 may include functional blocks that can represent functions implemented by a processor, software, or combination thereof (e.g., firmware).

As illustrated, in one embodiment, the apparatus 2000 may include an electrical component or means 2002 for receiving, from a source device, an electronic transmission of user comment data correlated to identifiers for audio/video content and a post-inception temporal point in the audio/video content. For example, the electrical component or means 2002 may include at least one control processor 2010 coupled to a memory component 2016. The control processor may operate an algorithm, which may be held as program instructions in the memory component. The algorithm may include, for example, receiving a data transmission using a network protocol (e.g., TCP/IP), processing the data transmission to discover the identifiers for the audio/video content and the post-inception temporal point, and processing the data transmission to discover the comment data.

The apparatus 2000 may further include an electrical component or module 2004 for configuring a link to the audio/video content including an indication of the post-inception temporal point. For example, the electrical component or means 2004 may include at least one control processor 2010 coupled to a memory component 2016. The control processor may operate an algorithm, which may be held as program instructions in the memory component. The algorithm may include, for example, querying a database based on the identifier for the audio/video content to obtain more descriptive information regarding the content, generating a text label, thumbnail graphic label, or combination thereof, that includes both the descriptive information for the video file and the temporal point associated with the label.

The apparatus 2000 may further include an electrical component or module 2006 for providing the user comment data with the link to a website host for publication on a website. For example, the electrical component or means 2006 may include at least one control processor 2010 coupled to a memory component 2016. The control processor may operate an algorithm, which may be held as program instructions in the memory component. The algorithm may include, for example, indentifying the website host, and transmitting a message to the website host including at least the link with a publication request.

The apparatus 2000 may include similar electrical components for performing any or all of the additional operations 1700, 1800 and 1900 described in connection with FIGS. 17-19, which for illustrative simplicity are not shown in FIG. 20.

In related aspects, the apparatus 2000 may optionally include a processor component 2010 having at least one processor, in the case of the apparatus 2000 configured as a network entity. The processor 2010, in such case, may be in operative communication with the components 2002-2006 or similar components via a bus 2012 or similar communication coupling. The processor 2010 may effect initiation and scheduling of the processes or functions performed by electrical components 2002-2006.

In further related aspects, the apparatus 2000 may include a network interface component 2014 enabling communication between a client and a server. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for implementing the processes and behavior of the components 2002-2006, and subcomponents thereof, or the processor 2010, or the methods disclosed herein. The memory component 2016 may retain instructions for executing functions associated with the components 2002-2006. While shown as being external to the memory 2016, it is to be understood that the components 2002-2006 can exist within the memory 2016.

Publication Server Operations and Apparatus

Figure 21:
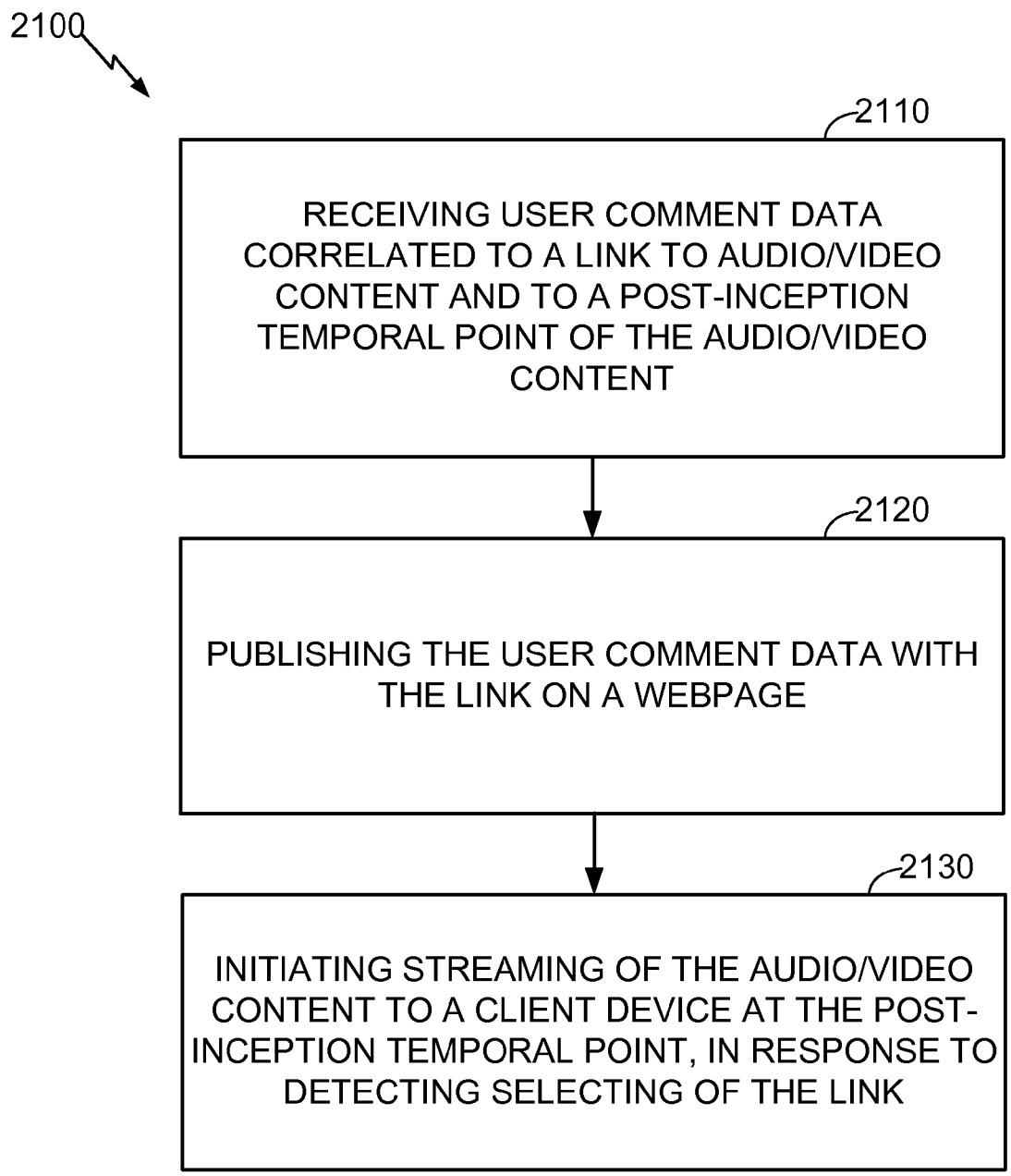
FIGS. 21-23 are diagrams illustrating operations that may be performed by a computer server in connection publishing a user comment correlated to a user selected temporal point of video data.

A server operating a social networking site or public forum site may perform a method 2100 for providing a link to audio/video content referencing a temporal point for user comment data, as shown in FIG. 21. The method 2100 may include, at 2110, receiving a link to audio/video content and to a post-inception temporal point of the audio/video content. The temporal point is "post-inception" in the sense that it is a time point after the beginning or inception of the video timeline, and may also be prior to the terminal or end time point of the video timeline. The link may be formatted for including in a Web page, for example an HTML, XML, or other page. The link may include a description or other indicator of the audio/video content and the post-inception temporal point. In some embodiments, the temporal point may be referenced by implication, for example the link may reference an address specifically set up for a video clip or portion based on the temporal point. In alternative embodiments, the link may include explicit data identifying the temporal point.

The method 2100 may include, at 2120, publishing the link on a webpage. The webpage may be of various types, for example a social networking site or public forum site. Further examples and more detailed aspects of publishing the link on a webpage are described elsewhere herein.

The method 2100 may include, at 2130, initiating streaming of the audio/video content to a client device at the post-inception temporal point, in response to detecting selection of the link. In an alternative, initiation of the streaming may be performed by a separate computer server. Initiation of the streaming may be performed by any entity addressed by the link. Such entity should have access to a copy of the audio-video content or portion thereof, optionally including the comment data. Such entity may detect the selection of the link by receiving a message, e.g., one or more TCP/IP packets, generated by a client device where the link is selected in response to user input.

Figure 22:
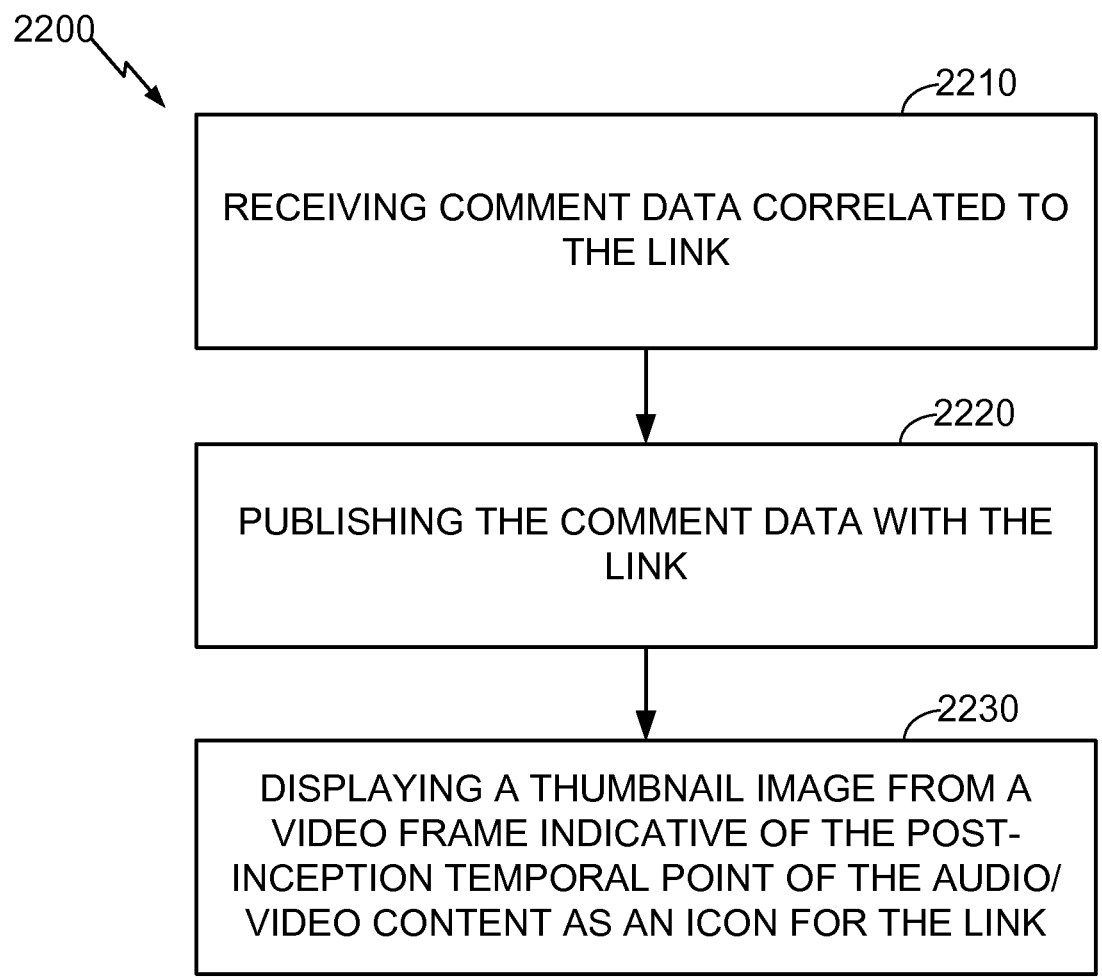
Figure 23:
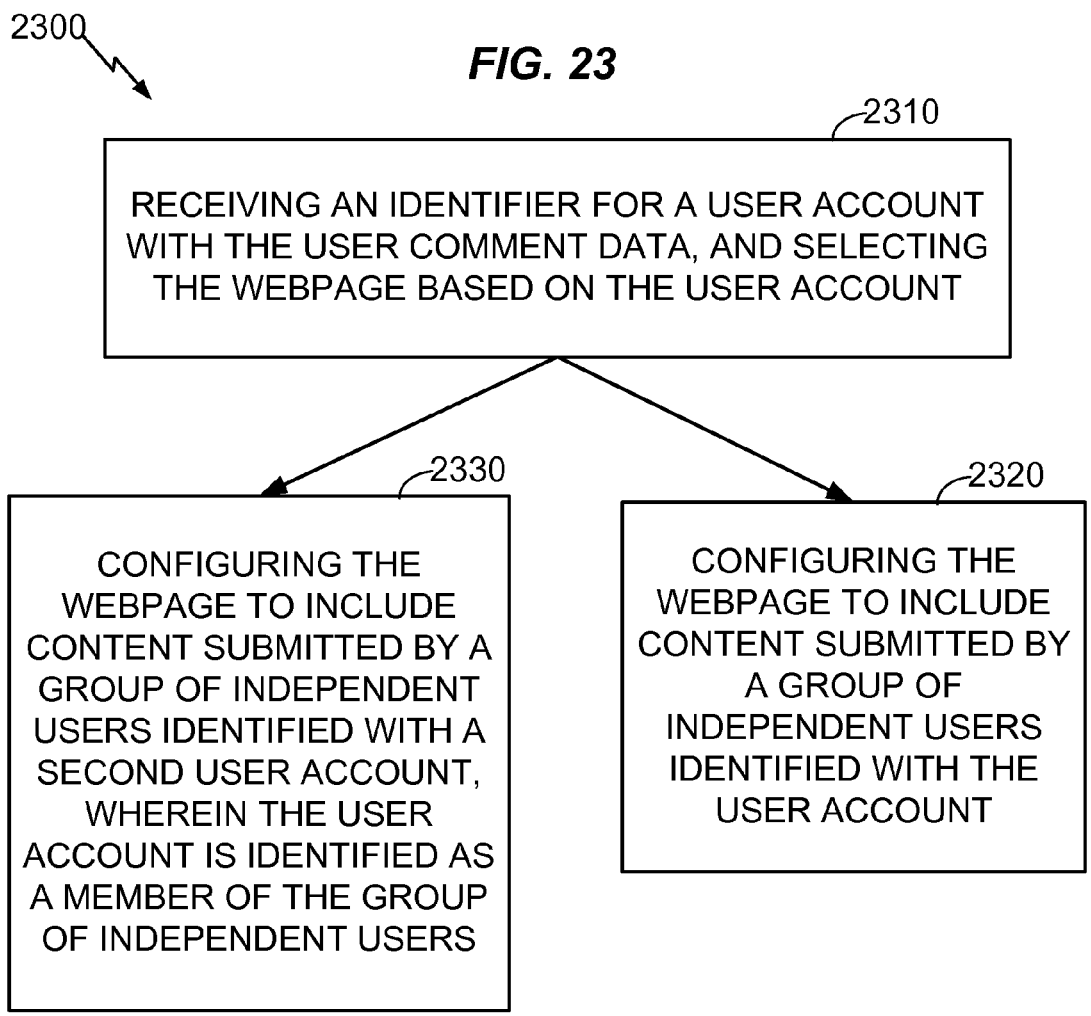

With reference to FIGS. 22-23, several additional operations 2200 and 2300 are depicted for providing a link to audio/video content referencing a temporal point for user comment data, which may be performed by server for a social networking Web site or public forum Web site, alone or in cooperation with a client device and/or one or more additional servers. One or more of operations 2200 and 2300 may optionally be performed as part of method 2100. The elements 2200 and 2300 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 2100 includes at least one of the operations 2200 and 2300, then the method 2100 may terminate after the at least one operation, without necessarily having to include any subsequent downstream operation(s) that may be illustrated.

In one embodiment with reference to FIG. 22, the method 2100 may further include, at 2210, receiving comment data correlated to the link. An example in accordance with this feature is shown in FIGS. 10 at 1002 and 318. The method 2100 may include, at 2220, publishing the comment data with the link. As shown in FIG. 10, the publication server may display the comments 318 in proximity to the link 1006 on the webpage.

The method 2100 may further include, at 2230, displaying a thumbnail image from a video frame indicative of the post-inception temporal point of the audio/video content as an icon for the link. For example, the thumbnail image may be generated from a video frame located at the temporal point. In addition, the server may display a textual indication of the temporal point with the thumbnail image.

With reference to FIG. 23, the method 2100 may further include, at 2310, receiving an identifier for a user account with the link, and selecting the webpage based on the user account. For example, for a social networking site, the server may select a home page for the user account, or other web page determined based on the user account. In a first alternative embodiment, the method 2100 may further include, at 2320, configuring the webpage to include content submitted by a group of independent users identified with the user account. For example, the page on which the link is published may be a page including content posted by the owner of the user account or the owner's designated friends or other designated group of independent users of the Web site. In a second alternative embodiment, the method 2100 may include, at 2330, configuring the webpage to include content submitted by a group of independent users identified with a second user account, wherein the user account is identified as a member of the group of independent users. For example, the page on which the link is published may be a page including content posted by the owner's designated friends or other group of independent users of the Web site designated by the owner.

Figure 24:
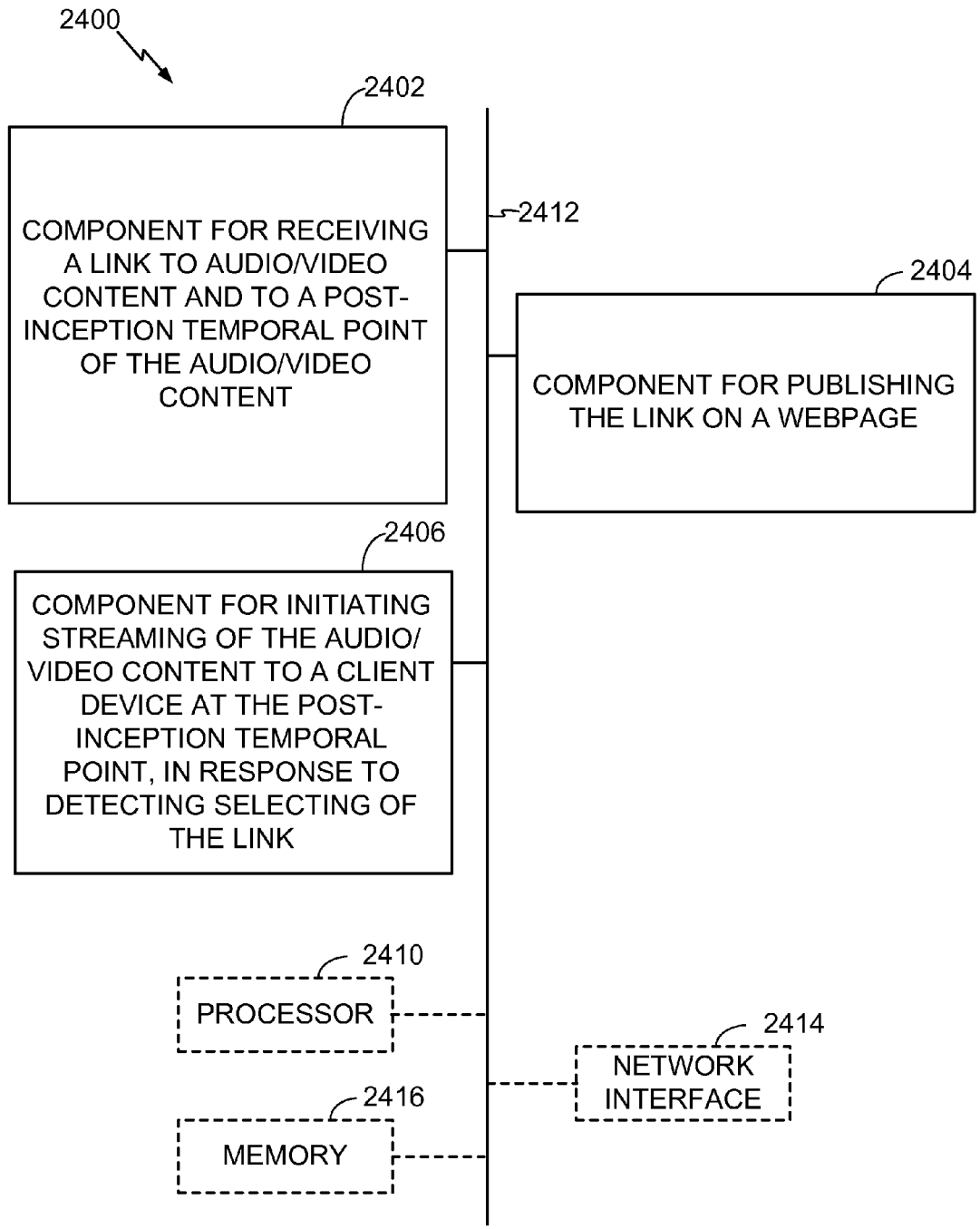
FIG. 24 is a diagram illustrating a server apparatus configured for distribution and configuration of a user comment correlated to a temporal point of video data.

With reference to FIG. 24, there is provided an exemplary apparatus 2400 that may be configured as computer server, client device, or combination of client and server, for providing a link to audio/video content referencing a temporal point for user comment data. The apparatus 2400 may include functional blocks that can represent functions implemented by a processor, software, or combination thereof (e.g., firmware).

As illustrated, in one embodiment, the apparatus 2400 may include an electrical component or means 2402 for receiving a link to audio/video content and to a post-inception temporal point of the audio/video content. For example, the electrical component or means 2402 may include at least one control processor 2410 coupled to a memory component 2416. The control processor may operate an algorithm, which may be held as program instructions in the memory component. The algorithm may include, for example, a program interface (e.g., an API) receiving information for posting on a website, and processing received information to identify the link to audio/video content and to the post-inception temporal point.

The apparatus 2400 may further include an electrical component or module 2404 publishing the link on a webpage. For example, the electrical component or means 2404 may include at least one control processor 2410 coupled to a memory component 2416. The control processor may operate an algorithm, which may be held as program instructions in the memory component. The algorithm may include, for example, automatically generating a webpage including the link, configuring an address or a link to the webpage within a website of linked pages, and placing the webpage in a publically accessible memory addressable via a Wide Area Network (WAN) or the like.

The apparatus 2400 may further include an electrical component or module 2406 for initiating streaming of the audio/video content to a client device at the post-inception temporal point, in response to detecting selecting of the link. For example, the electrical component or means 2406 may include at least one control processor 2410 coupled to a memory component 2416. The control processor may operate an algorithm, which may be held as program instructions in the memory component. The algorithm may include, for example, detecting the selection of the link by receiving a message, e.g., one or more TCP/IP packets, generated by a client device where the link is selected in response to user input. The algorithm may further include retrieving the audio/video content starting at the post-inception temporal point, configuring the content as streaming content packets, and transmitting the streaming content packets to the client device.

The apparatus 2400 may include similar electrical components for performing any or all of the additional operations 1300, 1400 described in connection with FIGS. 13-14, which for illustrative simplicity are not shown in FIG. 24.

In related aspects, the apparatus 2400 may optionally include a processor component 2410 having at least one processor, in the case of the apparatus 2400 configured as a server for a website, alone or in cooperation with another server and/or a client device. The processor 2410 may be in operative communication with the components 2402-2406 or similar components via a bus 2412 or similar communication coupling. The processor 2410 may implement initiation and scheduling of the processes or functions performed by electrical components 2402-2406.

In further related aspects, the apparatus 2400 may include a network interface component 2414 enabling communication between a client and a server. The apparatus 2400 may optionally include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for implementing the processes and behavior of the components 2402-2406, and subcomponents thereof, or the processor 2410, or the methods disclosed herein. The memory component 2416 may retain instructions for executing functions associated with the components 2402-2406. While shown as being external to the memory 2416, it is to be understood that the components 2402-2406 can exist within the memory 2416.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for providing user comment data, by a client device, the method comprising:
   detecting an indication that a user is interested in adding the user comment data for audio/video content in a comment window;
   outputting a comment placement window pointing to a progress indicator along a progress bar for the audio/video content during playback of audio/video content on an electronic display device of the client device, wherein the comment placement window estimates where the user comment data would be placed, the comment placement window is different from the comment window, the comment placement window previews where the user comment data will be placed, and the comment placement window changes position based on a location of the progress indicator;
   receiving the user comment data in the comment window;
   detecting a time that input of the user comment data is received during playback of audio/video content on the electronic display device, wherein detecting the time comprises:
      detecting a lag time for the user to enter the user comment data; and determining the time as an adjustment of the location along the progress bar based on the lag time;

determining a temporal point relative to the playback of the audio/video content correlated to the user comment data, based on the time; and transmitting the user comment data correlated to an identifier for the audio/video content and the temporal point to a computer server.

2. The method of claim 1, further comprising providing data for a user interface, including control objects for the playback of the audio/video content and entry of the user comment data, to the electronic display device.

3. The method of claim 1, wherein detecting the time is based on a time that input of the user comment data is initiated.

4. The method of claim 1, wherein detecting the time is based on a time that input of the user comment data is completed.

5. The method of claim 1, further comprising receiving the user input from a user input device local to the electronic display device.

6. The method of claim 1, further comprising detecting user input of the user comment data and outputting the comment placement window in response.

7. The method of claim 1, further comprising identifying a source identifier for the user comment data, and transmitting the source identifier to the computer server.

8. The method of claim 1, further comprising:
identifying a website and destination user account as a prospective publication site of the user comment data, based on further user input; and
transmitting information identifying the prospective publication site of the user comment data to the computer server.

9. The method of claim 1, further comprising:
playing the audio/video content; and
displaying the comment placement window and the comment window concurrently together while playing the audio/video content.

10. The method of claim 1, wherein the comment placement window is coupled to the location along the progress bar.

11. An apparatus, comprising:
at least one processor configured for:
detecting an indication that a user is interested in adding the user comment data for audio/video content in a comment window;
outputting a comment placement window pointing to a progress indicator along a progress bar for the audio/video content during playback of audio/video content on an electronic display device of the client device, wherein the comment placement window estimates where the user comment data would be placed, the comment placement window is different from the comment window, the comment placement window previews where the user comment data will be placed, and the comment placement window changes position based on a location of the progress indicator;
receiving the user comment data in the comment window;
detecting a time that input of the user comment data is received during playback of audio/video content on the electronic display device, wherein detecting the time comprises:
detecting a lag time for the user to enter the user comment data; and
determining the time as an adjustment of the location along the progress bar based on the lag time;

determining a temporal point relative to the playback of the audio/video content correlated to the user comment data, based on the time; and transmitting the user comment data correlated to an identifier for the audio/video content and the temporal point to a computer server; and a memory coupled to the at least one processor for storing data.

12. The apparatus of claim 11, wherein the processor is further configured for providing data for a user interface, including control objects for the playback of the audio/video content and entry of the user comment data, to the electronic display device.

13. The apparatus of claim 11, wherein the processor is further configured for identifying a source identifier for the user comment data, and transmitting the source identifier to the computer server.

14. The apparatus of claim 11, wherein the processor is further configured for identifying a website and destination user account as a prospective publication site of the user comment data, based on further user input; and
transmitting information identifying the prospective publication site of the user comment data to the computer server.

15. A computer program product, comprising:
a non-transitory computer-readable medium comprising code for causing a computer to:
detect an indication that a user is interested in adding the user comment data for audio/video content in a comment window;
output a comment placement window pointing to a progress indicator along a progress bar for the audio/video content during playback of audio/video content on an electronic display device of the client device, wherein the comment placement window estimates where the user comment data would be placed, the comment placement window is different from the comment window, the comment placement window previews where the user comment data will be placed, and the comment placement window changes position based on a location of the progress indicator;
receive the user comment data in the comment window;
detect a time that input of the user comment data is received during playback of audio/video content on the electronic display device, wherein detect the time comprises:
detect a lag time for the user to enter the user comment data; and
determine the time as an adjustment of the location along the progress bar based on the lag time;
determine a temporal point relative to the playback of the audio/video content correlated to the user comment data, based on the time; and
transmit the user comment data correlated to an identifier for the audio/video content and the temporal point to a computer server.

16. A method for providing a link to digital audio/video content responsive to user comment data, by a computer server, the method comprising:
determining an electronic transmission of user comment data from a source device, the user comment data correlated to identifiers for audio/video content and a post-inception temporal point in the audio/video content that is detected using a comment placement window that previewed where the user comment data would be placed and a lag time for a user to enter the user comment data, and the post-inception temporal point is determined as an adjustment of a location of a progress indicator along a progress bar based on the lag time;

configuring a link to the audio/video content including an indication of the post-inception temporal point; and providing the user comment data with the link to a website host for publication on a website, wherein the website includes the user comment data in a comment placement window located proximate to a progress bar during playing the audio/video content and pointing to a progress indicator along the progress bar based on the post-inception temporal point in the audio/video content.

17. The method of claim 16, further comprising generating a thumbnail image from a video frame indicative of the post-inception temporal point of the audio/video content.

18. The method of claim 17, further comprising configuring the link to include the thumbnail image.

19. The method of claim 16, further comprising receiving an identifier for the website host as a prospective publication site of the user comment data from the source device.

20. The method of claim 19, further comprising receiving an identifier for a destination user account at the website host from the source device, and providing information identifying the destination user account to the website host.

21. The method of claim 16, further comprising providing the audio/video content to the website host.

22. The method of claim 16, further comprising truncating the audio/video content based on the post-inception temporal point to provide a truncated audio/video content, and providing the truncated audio/video content to the website host.

23. The method of claim 16, wherein:
when entering of the user comment data was detected, in response to the detecting, the comment placement window was outputted pointing to the location along the progress bar for the audio/video content estimating where the user comment data would be placed.

24. The method of claim 16, wherein the user comment data is received in a comment window different from the comment placement window.

25. An apparatus, comprising:
at least one processor configured for:
determining an electronic transmission of the user comment data from a source device, the user comment data correlated to an identifier for audio/video content and a post-inception temporal point in the audio/video content that is detected using a comment placement window that previewed where the user comment data would be placed and a lag time for a user to enter the user comment data, and the post-inception temporal point is determined as an adjustment of a location of a progress indicator along a progress bar based on the lag time;
configuring a link to the audio/video content including an indication of the post-inception temporal point; and
providing the user comment data with the link to a website host for publication on a website, wherein the website includes the user comment data in a comment placement window located proximate to a progress bar during playing the audio/video content and pointing to a progress indicator along the progress bar based on the post-inception temporal point in the audio/video content; and
a memory coupled to the at least one processor for storing data.

26. The apparatus of claim 25, wherein the processor is further configured for generating a thumbnail image from a video frame indicative of the post-inception temporal point of the audio/video content.

27. The apparatus of claim 26, wherein the processor is further configured for configuring the link to include the thumbnail image.

28. The apparatus of claim 25, wherein the processor is further configured for receiving an identifier for the website host as a prospective publication site of the user comment data from the source device.

29. The apparatus of claim 28, wherein the processor is further configured for receiving an identifier for a destination user account at the website host from the source device, and providing information identifying the destination user account to the website host.

30. The apparatus of claim 25, wherein the processor is further configured for providing the audio/video content to the website host.

31. The apparatus of claim 25, wherein the processor is further configured for truncating the audio/video content based on the post-inception temporal point to provide a truncated audio/video content, and providing the truncated audio/video content to the website host.

32. A computer program product, comprising:
a non-transitory computer-readable medium comprising code for causing a computer to:
determine an electronic transmission of the user comment data from a source device, the user comment data correlated to an identifier for audio/video content and a post-inception temporal point in the audio/video content that is detected using a comment placement window that previewed where the user comment data would be placed and a lag time for a user to enter the user comment data, and the post-inception temporal point is determined as an adjustment of a location of a progress indicator along a progress bar based on the lag time;
configure a link to the audio/video content including an indication of the post-inception temporal point; and
provide the user comment data with the link to a website host for publication on a website, wherein the website includes the user comment data in a comment placement window located proximate to a progress bar during playing the audio/video content and pointing to a progress indicator along the progress bar based on the post-inception temporal point in the audio/video content.

* * * * *

UNITED STATES PATENT AND TRADEMARK OFFICE
CERTIFICATE OF CORRECTION

PATENT NO.        : 9,066,145 B2
APPLICATION NO.   : 13/431952
DATED             : June 23, 2015
INVENTOR(S)       : Jason A. Kilar et al.

Page 1 of 1

It is certified that error appears in the above-identified patent and that said Letters Patent is hereby corrected as shown below:

In the Claims:

In column 28, claim 16, line 62, please change "related to identifiers for audio/video" to --related to an identifier for audio/video--.

Signed and Sealed this
Third Day of November, 2015

Michelle K. Lee
*Director of the United States Patent and Trademark Office*